(12) United States Patent
Rechenbach et al.

(10) Patent No.: US 11,077,746 B2
(45) Date of Patent: Aug. 3, 2021

(54) POWER SPLIT CONTINUOUSLY VARIABLE TRANSMISSION WITH AT LEAST FOUR TRAVEL RANGES

(71) Applicant: ZF Friedrichshafen AG, Friedrichshafen (DE)

(72) Inventors: Philipp Rechenbach, Markdorf (DE); Benedikt Reick, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/761,279

(22) PCT Filed: Oct. 11, 2018

(86) PCT No.: PCT/EP2018/077734
§ 371 (c)(1),
(2) Date: May 4, 2020

(87) PCT Pub. No.: WO2019/091693
PCT Pub. Date: May 16, 2019

(65) Prior Publication Data
US 2021/0188077 A1    Jun. 24, 2021

(30) Foreign Application Priority Data

Nov. 10, 2017    (DE) ..................... 10 2017 219 999.7

(51) Int. Cl.
*B60K 6/54*        (2007.10)
*B60K 6/543*       (2007.10)
(Continued)

(52) U.S. Cl.
CPC .............. *B60K 6/543* (2013.01); *B60K 6/365* (2013.01); *F16H 37/084* (2013.01); *F16H 47/04* (2013.01);
(Continued)

(58) Field of Classification Search
None
See application file for complete search history.

(56) References Cited

U.S. PATENT DOCUMENTS 3,861,240 A * 1/1975 Nolan ..................... F16H 37/10
                                                    475/81
4,232,568 A * 11/1980 Maeda .................... F16H 47/04
                                                    475/81
(Continued)

FOREIGN PATENT DOCUMENTS

DE        33 42 047 A1    6/1985
DE        37 09 191 A1    5/1988
(Continued)

OTHER PUBLICATIONS

German Search Report Corresponding to 10 2017 219 999.7 dated Jul. 13, 2018.
(Continued)

*Primary Examiner* — Dirk Wright
(74) *Attorney, Agent, or Firm* — Finch & Maloney, PLLC; Michael J. Bujold

(57) ABSTRACT

A continuously variable power-split transmission with at least four driving ranges, within which the gear ratio of the power-split transmission can be continuously varied by a variator. A first planetary gearset with a plurality of shafts can be connected via shifting elements with another planetary gearset that also has a plurality of shafts and can be connected with a transmission output shaft. The first planetary gearset comprises four shafts and can be connected, via a first shaft, with a transmission input shaft and a first shaft of the variator. Furthermore, the first planetary gearset is connected, via a second shaft, to a second shaft of the variator, and the first planetary gearset is coupled, via a third shaft, to halves of two shifting elements and, via a fourth (Continued)

shaft, the first planetary gearset is coupled to a shifting element half of a further shifting element.

27 Claims, 27 Drawing Sheets

(51) Int. Cl.
| | |
|---|---|
| *H02K 7/00* | (2006.01) |
| *H02K 7/108* | (2006.01) |
| *H02K 7/116* | (2006.01) |
| *F16H 47/04* | (2006.01) |
| *B60K 6/365* | (2007.10) |
| *F16H 37/08* | (2006.01) |
| *B60K 6/445* | (2007.10) |

(52) U.S. Cl.
CPC ............. *H02K 7/006* (2013.01); *H02K 7/108* (2013.01); *H02K 7/116* (2013.01); *B60K 6/445* (2013.01); *B60Y 2200/92* (2013.01); *F16H 2037/0866* (2013.01); *F16H 2047/045* (2013.01); *F16H 2702/02* (2013.01)

(56) References Cited

U.S. PATENT DOCUMENTS

| | | | |
|---|---|---|---|
| 4,976,666 A | 12/1990 | Meyerle | |
| 5,080,637 A * | 1/1992 | Tenberge | F16H 47/04 |
| | | | 475/219 |
| 5,980,411 A * | 11/1999 | Wontner | F16H 47/04 |
| | | | 475/76 |
| 6,042,496 A | 3/2000 | Lehle et al. | |
| 6,450,912 B2 * | 9/2002 | Todeschini | F16H 47/04 |
| | | | 475/72 |
| 7,465,245 B2 * | 12/2008 | Ripamonti | F16H 47/04 |
| | | | 475/72 |
| 7,651,429 B2 | 1/2010 | Kamm et al. | |
| 8,758,181 B2 | 6/2014 | Calvert | |
| 9,488,263 B2 * | 11/2016 | Vasudeva | F16H 47/04 |

FOREIGN PATENT DOCUMENTS

| | | |
|---|---|---|
| DE | 41 42 545 A1 | 6/1993 |
| DE | 195 22 833 A1 | 1/1997 |
| DE | 197 39 906 A1 | 3/1999 |
| DE | 601 06 504 T2 | 10/2005 |
| DE | 10 2006 028 789 A1 | 4/2008 |
| EP | 0 476 794 A1 | 3/1992 |
| GB | 2 261 039 A | 5/1993 |
| WO | 2015/191992 A1 | 12/2015 |

OTHER PUBLICATIONS

International Search Report Corresponding to PCT/EP2018/077734 dated Feb. 1, 2019.
Written Opinion Corresponding to PCT/EP2018/077734 dated Feb. 1, 2019.
International Preliminary Report on Patentability Corresponding to PCT/EP2018/077734 dated Oct. 2, 2019.

* cited by examiner

POWER SPLIT CONTINUOUSLY VARIABLE TRANSMISSION WITH AT LEAST FOUR TRAVEL RANGES

This application is a National Stage completion of PCT/EP2018/077734 filed Oct. 11, 2018, which claims priority from German patent application serial no. 10 2017 219 999.7 filed Nov. 10, 2017.

FIELD OF THE INVENTION

The invention relates to a continuously variable power-split transmission with at least four driving ranges.

BACKGROUND OF THE INVENTION

From DE 195 22 833 A1 a continuously variable power-split transmission with a mechanical power branch and with a hydrostatic power branch is known. The power branches are driven by a common driveshaft and are summed by a mechanical linkage. The mechanical linkage comprises a plurality of planetary gearsets and clutches, and is connected to a drive output shaft. In this case the mechanical linkage is arranged on a drive input shaft. One of the planetary gearsets of the mechanical linkage can be brought into functional connection with the drive output shaft by means of drive direction clutches for forward driving and driving in reverse.

A further planetary gearset of the mechanical linkage comprises three simple three-shaft planetary transmissions and in the area of five shafts is connected to the transmission input shaft, to a variator of the hydrostatic power branch and to shifting element halves of the clutches, and can be coupled by way of the clutches to the one planetary gearset.

However, the known power-split transmission is characterized by much cost and effort for design and construction. Due to undesirably high reactive power flows in the area of the mechanical linkage, during the operation of the power-split transmission power losses occur which have an adverse effect on the efficiency of the power-split transmission.

SUMMARY OF THE INVENTION

Accordingly, the purpose of the present invention is to provide a simply designed, continuously variable power-split transmission that can be operated with high efficiency.

According to the invention, this objective is achieved with a continuously variable power-split transmission having the characteristics specified in the independent claim(s).

The continuously variable power-split transmission according to the invention is designed with at least four driving ranges, in which the gear ratio in the area of a variator can be varied continuously. A first planetary gearset comprising a plurality of shafts can be connected by way of a plurality of shifting elements to a second planetary gearset which has a plurality of shafts and is or can be functionally connected to a transmission output shaft.

According to the invention, the first planetary gearset has four shafts and by way of a first shaft is or can be brought into functional connection with a transmission input shaft and a first shaft of the variator. In addition, the first planetary gearset is functionally connected by a second shaft to a second shaft of the variator, while the first planetary gearset is coupled by a third shaft to shifting element halves of two shifting elements and by a fourth shaft to a shifting element half of a further shifting element.

By virtue of the connection according to the invention of the first planetary gearset to the transmission input shaft, the variator and the shifting elements, the continuously variable power-split transmission according to the invention can be constructed in a simple manner with a first planetary gearset that has only four shafts. Compared with the solution known from the prior art, the first planetary gearset can be made less expensively and reduced need of fitting space, and in addition low reactive power flows occur in a first planetary gearset designed in this way.

To obtain the four driving ranges as compactly and inexpensively as possible, in a further development of the continuously variable power-split transmission according to the invention, the third shaft of the first planetary gearset can be connected by way of the shifting element with whose shifting element half the third shaft of the first planetary gearset is coupled, to a first shaft of the second planetary gearset. Furthermore, for that purpose the third shaft of the first planetary gearset can be functionally connected to a second shaft of the second planetary gearset by way of the second shifting element, with whose shifting element half the third shaft of the first planetary gearset is also coupled.

In another cost and fitting-space saving embodiment of the continuously variable power-split transmission according to the invention, the fourth shaft of the first planetary gearset can be coupled by way of the further shifting element to the first shaft of the second planetary gearset and to a shifting element half of an additional shifting element. Moreover, the fourth shaft of the first planetary gearset can be functionally connected with the second shaft or with the third shaft of the second planetary gearset by way of the additional shifting element.

In an embodiment of the continuously variable power-split transmission that is alternative to the above and is also economical and fitting space-saving, the fourth shaft of the first planetary gearset can be coupled by means of the further shifting element to the first shaft of the second planetary gearset, while the second shaft of the second planetary gearset can be functionally connected to the third shaft of the second planetary gearset by an additional shifting element.

If the second shaft of the second planetary gearset can be connected by a shifting element to a component fixed on the housing in a rotationally fixed manner, at least two of the four driving ranges can be obtained with high efficiency in a simply designed manner at the same time as occupying little fitting space.

In the area of the transmission input shaft, in a further development of the continuously variable power-split transmission according to the invention a shifting element is provided by way of which a drive machine of a vehicle drive-train built with the power-split transmission, that can be coupled to the transmission input shaft, can be brought into functional connection with or decoupled from the first shaft of the first planetary gearset. Thus, in a simply designed manner it is made possible not to apply to the transmission input shaft drag torques from the drive machine during driving operation of a vehicle built with the continuously variable power-split transmission according to the invention, while the drive machine that can be brought into functional connection with the transmission input shaft is switched off.

If the transmission input shaft is functionally connected to an electric machine, some of the torque applied to the transmission input shaft can be used to generate electrical energy if the electric machine can be operated as a generator. The electrical energy produced by the electric machine can for example be made available for supplying an on-board network of a vehicle built with the continuously variable power-split transmission according to the invention, for charging an electric accumulator, and/or for driving an electric machine. Furthermore, while the electric machine is being operated as a motor, purely electric driving operation of a vehicle built with the power-split transmission according to the invention can be obtained, while the torque from the electric machine alone is made available at the drive output and/or in the area of a power take-off shaft. In addition it is also made possible, during a so-termed boost operation, at the same time to apply torque from the electric machine and from a drive machine such as an internal combustion engine of a vehicle drive-train that can also be coupled to the transmission input shaft, in the area of the drive output and/or a power take-off shaft.

In such a case it can be provided that during its motor operation, the electric machine can be supplied with electrical energy from an electric storage device on the vehicle and/or from an external power supply such as a power network. For that purpose a vehicle can be made, for example, with an appropriate interface such as a power socket and/or a plug, in order to be able to connect the vehicle or its electric machine to the power network to the extent desired.

The generator can be connected directly to the transmission input shaft in a simply designed manner at the same time as losses remain low.

If the electric machine is coupled to the transmission input shaft via at least one spur gear stage and/or via at least one planetary gearset, the torque to be used for driving the generator or to be made available is lower than when the generator is connected directly to the transmission input shaft. Otherwise, however, the couplings with gearwheel stages are characterized by higher mechanical effort and, during operation, by higher mechanical power loss. Since as is known, electric machines can be operated more efficiently at higher rotational speeds than in the lower rotational speed ranges, the power-split transmission according to the invention can be operated with greater overall efficiency with appropriate design of the gear ratio of the at least one spur gear stage or the at least one planetary gear system and the electric machine, compared to direct connection of the electric machine to the transmission input shaft.

If the continuously variable power-split transmission comprises two driving-direction clutches that can be switched into and out of the force flow, and the gearwheel pairs associated with them, a vehicle built with the power-split transmission according to the invention can be operated both in the forward-driving and in the reverse-driving direction. In that case a rotational direction of the transmission output shaft when the first driving-direction clutch is engaged corresponds to the rotational direction of the transmission input shaft. In contrast, if the second driving-direction clutch is engaged the rotational direction of the transmission output shaft is different from the rotational direction of the transmission input shaft. Furthermore, the transmission input shaft can be functionally connected via the driving-direction clutches with the first shaft of the first planetary gearset, or the transmission output shaft can be functionally connected via the driving-direction clutches with the second planetary gearset. In one arrangement the driving-direction clutches in the force flow between the transmission input shaft and the first shaft of the first planetary gearset are made smaller than in an arrangement in the force flow of the transmission between the second planetary gearset and the transmission output shaft.

In order to adapt the continuously variable power-split transmission to a fitting space available in a vehicle, in further embodiments of the continuously variable power-split transmission according to the invention the driving-direction clutches are arranged in the area of the functional connection between the transmission input shaft and the first planetary gearset or in the area of the functional connection between the second planetary gearset and the transmission output shaft.

If the variator is in the form of a hydraulic variator with two hydraulic machines, in which the displacement volume of at least one of the hydraulic machines can be varied, the power-split transmission according to the invention is characterized by a high power density.

In an alternative embodiment of the continuously variable power-split transmission according to the invention that can be operated with high efficiency, the variator is in the form of an electric variator with two electric machines. In this case the possibility exists of operating the electric machine of the variator that is functionally connected to the transmission input shaft over the full operating range of the transmission, in the case of direct coupling to the transmission input shaft, respectively at the rotational speed of the drive machine, or if the electric machine is connected via a gear system, at a rotational speed that corresponds to the rotational speed of the drive machine. In contrast, the rotational speed of the other electric machine coupled to the second shaft of the first planetary gearset can be varied continuously in order to adjust the gear ratio of the power-split transmission according to the invention, independently of the rotational speed of the transmission input shaft.

In space-saving embodiments of the continuously variable power-split transmission according to the invention the variator, by way of its first shaft, is functionally connected to the first shaft of the first planetary gearset directly, via spur gearwheels and/or via a planetary gearset, and by way of its second shaft, it is functionally connected via spur gearwheels and/or via a planetary gearset to the second shaft of the first planetary gearset.

In this case, if the variator is connected directly to the transmission input shaft and/or to the second shaft of the first planetary gearset, the variator must be made larger, since the torque applied by the transmission input shaft and by the second shaft of the first planetary gearset, respectively, is greater than when the variator is connected to the transmission input shaft and to the second shaft by way of spur gearwheels and/or the planetary gearset. In contrast, however, fitting space is also needed for the additional spur gearwheels and/or the additional planetary gearset, which is sometimes made available due to the then possible smaller size of the variator. The choice of which way to connect the variator to the transmission input shaft and to the second shaft of the first planetary gearset is made as a function of the application case at the time and of the fitting space available in the vehicle.

If the first planetary gearset, the second planetary gearset, the driving-direction clutches, the shifting elements and/or the variator are arranged coaxially with one another, the continuously variable power-split transmission is characterized in that it needs little fitting space in the radial direction.

In embodiments of the continuously variable power-split transmission according to the invention which require little fitting space in the axial direction, the first planetary gearset, the second planetary gearset, the driving-direction clutches, the shifting elements and/or the variator are radially offset relative to one another and are arranged on countershafts a distance apart from one another. These embodiments are characterized by the need for more fitting space in the radial direction than the coaxial arrangement of the assemblies of the power-split transmission.

If the variator is arranged in the axial direction between the transmission input and the first planetary gearset, coaxially with the first planetary gearset, or in the radial direction offset relative to the first planetary gearset, then the shafts of the variator can be made shorter in the axial direction. In that way deflections between support points in the area of the variator shafts are small.

In a further embodiment of the continuously variable power-split transmission according to the invention that can be designed in a space-saving manner, the second shaft of the first planetary gearset, in the axial direction, is connected between the transmission input and the first planetary gearset to the second shaft of the variator, while the first shaft of the variator is functionally connected to the first shaft of the first planetary gearset in the axial direction between the second planetary gearset and the transmission output.

In a further development of the continuously variable power-split transmission according to the invention characterized by little fitting space requirement, the driving-direction clutches are radially offset relative to one another and are preferably arranged in a common plane in the axial direction.

The continuously variable power-split transmission according to the invention can be integrated into various existing vehicles in a simple manner, if the transmission input and the transmission output are arranged on the same side or in the axial direction on different sides.

In an embodiment of the continuously variable power-split transmission according to the invention that can be operated with high efficiency, the first planetary gearset comprises a stepped planetary gear assembly. In this case the first shaft of the first planetary gearset is connected to a sun gear of the stepped planetary gear assembly, the second shaft of the first planetary gearset to a ring gear of the stepped planetary gear assembly, the third shaft of the first planetary gearset to a planetary carrier of the stepped planetary gear assembly and the fourth shaft of the first planetary gearset to a further sun gear of the stepped planetary gear assembly. On the planetary carrier stepped planetary gearwheels are arranged and can rotate, which in a larger diameter range mesh with the ring gear and the further sun gear, whose diameter is in turn smaller than the diameter of the sun gear. Furthermore, The planetary gearwheels with a smaller diameter range engage with the sun gear. By using such a stepped planetary gear assembly, no, or only little reactive power circulates in the area of the first planetary gearset, so the transmission according to the invention can be operated with high efficiency.

For that purpose, in an embodiment of the continuously variable power-split transmission according to the invention that can be produced with little cost and effort, the first planetary gearset comprises two ring gears, a sun gear and a planetary carrier, with a plurality of planetary gearwheels mounted to rotate on the planetary carrier. In this, at least a first planetary gearwheel meshes with one of the ring gears and with at least one second planetary gearwheel, while the at least one second planetary gearwheel is engaged with the other ring gear and the sun gear. The first shaft of the first planetary gearset is connected to one of the rings gears, the second shaft of the first planetary gearset is connected to the other ring gear, the third shaft of the first planetary gearset to the planetary carrier and the fourth shaft of the first planetary gearset to the sun gear.

If the first planetary gearwheel and the second planetary gearwheel are arranged offset from one another in the axial direction and mounted to rotate on the same diameter, and if they have the same number of teeth as the ring gears, the rotational speed of the second shaft of the first planetary gearset can be varied continuously in all the driving ranges within a section range that is symmetrical relative to the zero-point of the rotational speed of the second shaft.

In an embodiment of the continuously variable power-split transmission according to the invention that is also simple to produce, the first planetary gearset comprises two simple planetary gear assemblies each having a ring gear, a planetary carrier with planetary gearwheels mounted to rotate on it, and a sun gear. The first shaft of the first planetary gearset is in this case connected to the planetary carrier of the first simple gear assembly and the second shaft of the first planetary gearset is connected to the sun gear of the first simple planetary gear assembly and to the ring gear of the second simple planetary gear assembly. In addition, the third shaft of the first planetary gearset is functionally connected to the planetary carrier of the second simple planetary gear assembly and the fourth shaft of the first planetary gearset is functionally connected to the sun gear of the second simple planetary assembly and to the ring gear of the first simple planetary gear assembly.

The last-described embodiment of the continuously variable power-split transmission according to the invention is characterized in that it occupies little space in the axial direction if the first simple planetary gear assembly is arranged radially inside the second simple planetary gear assembly.

A further embodiment of the continuously variable power-split transmission according to the invention that can be produced simply is formed with a first planetary gearset that comprises two simple planetary gear assemblies, each with a ring gear, a planetary carrier with planetary gearwheels mounted to rotate on it, and a sun gear. The first shaft of the first planetary gearset is connected to the planetary carrier of the first simple planetary gear assembly. The second shaft of the first planetary gearset is functionally connected to the ring gear of the second simple planetary gear assembly. In addition the third shaft of the first planetary gearset is connected to the planetary carrier of the second simple planetary gear assembly and to the ring gear of the first simple planetary gear assembly. Moreover, the fourth shaft of the first planetary gearset is coupled to the sun gear of the second simple planetary gear assembly and to the sun gear of the first simple planetary gear assembly.

In a further space-saving embodiment of the continuously variable power-split transmission according to the invention that can be produced inexpensively, the first planetary gearset comprises a Ravigneaux gearset. The first shaft of the first planetary gearset is coupled to a planetary carrier of the Ravigneaux gearset. The second shaft of the first planetary gearset is functionally connected to a sun gear of the Ravigneaux gearset, while the third shaft of the first planetary gearset is connected to a ring gear of the Ravigneaux gearset. Moreover, the fourth shaft of the first planetary gearset is functionally connected to a further sun gear of the Ravigneaux gearset. In this case the sun gear has a smaller diameter than the further sun gear.

In a further, space-saving embodiment of the continuously variable power-split transmission according to the invention that can be produced inexpensively, the first planetary gearset of the power-split transmission comprises a planetary gear assembly with two ring gears, with a planetary carrier and with one sun gear. A plurality of planetary gearwheels are mounted to rotate on the planetary carrier. Some of the planetary gearwheels are made with a larger axial length than the rest of the planetary gearwheels. The longer planetary gearwheels mesh with the one of the ring gears, the sun gear and the shorter planetary gearwheels, while the shorter planetary gearwheels engage with the longer planetary gearwheels and with the other ring gear. One ring gear is made with a smaller diameter than the other ring gear an is surrounded radially by the larger ring gear.

In this case, in a simply designed further development of the last-described embodiment of the power-split transmission that can be produced inexpensively, the first shaft of the first planetary gearset is connected to the planetary carrier while the second shaft of the first planetary gearset is coupled to the sun gear. In addition the third shaft of the first planetary gearset is functionally connected to the larger ring gear and the fourth shaft of the first planetary gearset is coupled to the smaller ring gear.

A further development of the continuously variable power-split transmission comprises a second planetary gearset in the form of a simple planetary assembly. In this case the first shaft of the second planetary gearset forms the sun gear, the second shaft of the second planetary gearset forms the ring gear and the third shaft of the second planetary gearset forms the planetary carrier, with planetary gearwheels mounted to rotate on the planetary carrier.

Both the characteristics specified in the claims and those indicated in the following description of example embodiments of the continuously variable power-split transmission according to the invention are in each case suitable, whether as stand-alone features or in any combination with one another, as further developments of the object of the invention.

Further advantages and advantageous embodiments of the continuously variable power-split transmission according to the invention emerge from the claims and from the example embodiments whose principles are described in what follows with reference to the drawing. In the description of the various example embodiments, for the sake of clarity the same indexes are used for structurally and functionally equivalent components.

DETAILED DESCRIPTION OF THE PREFERRED EMBODIMENTS

Figure 1:
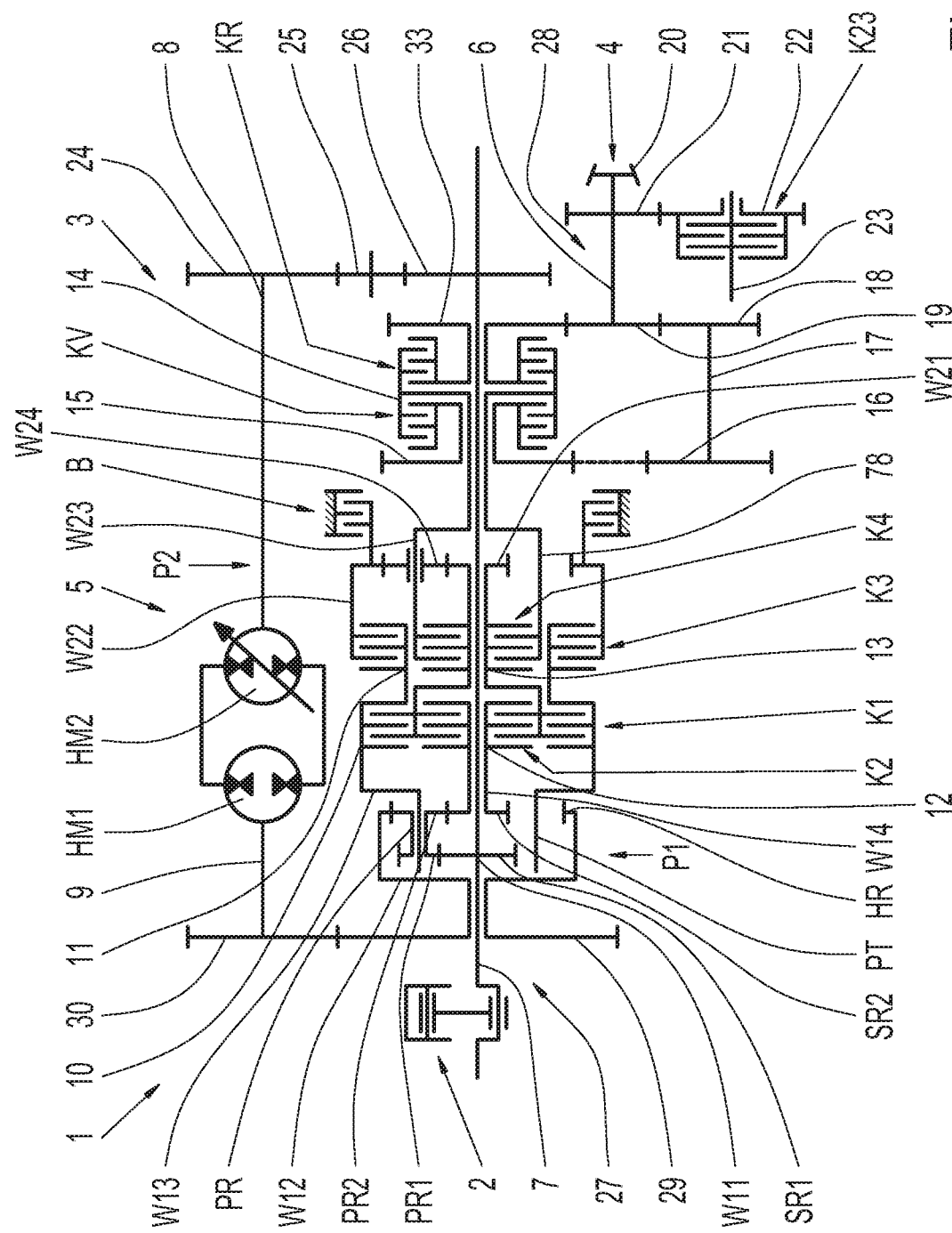
FIGS. 1, 2, 3, 4, 5A, 5B, 6, 7, 8, 9, 10, 11, 12, 13, 14, 15, 16, 17, 18, 19, 20, 21, 22, 23, 24, 25 and 26 show in each case a schematic representation of a vehicle drive-train, wherein the vehicle drive-trains are respectively constructed with various embodiments of a continuously variable power-split transmission.

FIG. 1 shows a very schematic view of a vehicle drive-train 1 with a drive machine 2 in the form of an internal combustion engine, with a continuously variable power-split transmission 3, and with a drive output 4. In the power-split transmission 3 four driving ranges can be obtained, within which the gear ratio of the power-split transmission 3 can be continuously varied with the help of a variator 5. A first planetary gearset P1 comprising a plurality of shafts W11 to W14 can be functionally connected with a further planetary gearset P2 also comprising a plurality of shafts W21 to W23 by means of a plurality of shifting elements K1 to K4. The second planetary gearset P2 can be functionally connected with a transmission output shaft 6 by means of so-termed driving-direction clutches KV and KR.

The first planetary gearset P1 is functionally connected by way of a first shaft W11 to a transmission input shaft 7 and a first shaft 8 of the variator 5. Furthermore, the first planetary gearset P1 is connected by a second shaft W12 to a second shaft 9 of the variator 5. In addition the first planetary gearset P1 is coupled by a third shaft W13 to shifting element halves 10, 11 of the shifting elements K1 and K3 and by a fourth shaft W14 to a shifting element half 12 of a further shifting element K2.

The third shaft W13 of the first planetary gearset P1 can be functionally connected via the shifting element K1 with a first shaft W21, in the form of a sun gear, of the second planetary gearset P2 and by means of the further shifting element K3 with a second shaft W22 of the second planetary gearset P2.

Moreover, the fourth shaft W14 of the first planetary gearset P1 can be coupled by the further shifting element K2 to the first shaft W21 of the second planetary gearset P2 and to a shifting element half 13 on the transmission input side of an additional shifting element K4, whose shifting element half 78 on the transmission output side is connected to a third shaft W23 of the second planetary gearset P2. Thus, the fourth shaft W14 of the first planetary gearset P1 can be functionally connected via the additional shifting element K4 with the third shaft W23 of the second planetary gearset P2.

In the present case the second planetary gearset P2 can be functionally connected via the driving-direction clutches KV and KR, by way of its third shaft W23 which is in the form of a planetary carrier, with the transmission output shaft 6.

In the present case the third shaft W23 of the second planetary gearset P2 is connected in a rotationally fixed manner to a common shifting element half 14 of the driving-direction clutches KV and KR. If both driving-direction clutches KV and KR are open, the functional connection between the third shaft W23 of the second planetary gearset P2 and the transmission output shaft 6 is separated. For the case when the driving-direction clutch KV for forward driving is closed and the driving-direction clutch KR for reverse driving is at the same time in its fully open operating condition, a loose wheel 15 arranged to rotate on the third shaft W23 of the second planetary gearset P2 is connected to the third shaft W23. The loose wheel 15 meshes with a fixed wheel 16 of a countershaft 17, which is made with a further fixed wheel 18.

The further fixed wheel 18 in turn meshes with a fixed wheel 19 of the transmission output shaft 6, which in the example embodiment of the vehicle drive-train 1 shown in FIG. 1 is in functional connection by way of a bevel gear 20 with a drivable vehicle axle (not illustrated further). By way of the driving-direction clutch KR, a loose wheel 33 also arranged to rotate on the transmission input shaft 7 can be connected rotationally fixed to the third shaft W23 of the second planetary gearset P2, which loose wheel engages with the fixed wheel 19. In addition, as shown in FIG. 1 the possibility exists that a further fixed wheel 21 of the transmission output shaft 6 meshes with a loose wheel 22 mounted to rotate on a further countershaft 23, which loose wheel can be connected rotationally fixed to the further countershaft 23 by means of a further shifting element K23. By way of the further countershaft 23, the transmission output shaft 6 cam be coupled to a further drivable vehicle axle of the vehicle drive-train 1, whereby a vehicle made with the vehicle drive-train 1, such as an agricultural machine or the like, can be obtained as an all-wheel-drive vehicle.

Otherwise than as above, the transmission output shaft 6 can be coupled to one or more drivable vehicle axles in other suitable ways. The connection between the transmission output shaft 6 and such drivable vehicle axles can be formed by means of a central differential with an associated bridging clutch or other suitable coupling devices. In the area of the central differential power-splitting takes place between two drivable vehicle axles without any additional control and regulation complexity, wherein the power-splitting of the central differential can be deactivated by means of the bridging clutch with little complexity.

Furthermore, it is possible to connect to one another two drivable axles that can be brought into functional connection with the transmission output shaft 6, and in that way to provide a permanent all-wheel drive or to couple only one drivable vehicle axle, preferably the rear axle of the vehicle, with the transmission output shaft.

Depending on the respective application at hand, the drivable vehicle axle functionally connected to the transmission output shaft 6 by means of the bevel gear 20 can be a vehicle rear axle or a vehicle front axle and the drivable further vehicle axle functionally connected to the countershaft 23 can be the vehicle front axle or the vehicle rear axle.

The first shaft 8 of the variator 5 is, in the present case, functionally connected to the transmission input shaft 7 by way of a fixed wheel 24 of the first shaft 8 of the variator 5, an intermediate gearwheel 25 that meshes with it and a fixed wheel 26 of the transmission input shaft 7 that engages with the gearwheel 25. For that purpose, starting from the transmission input 27 the transmission input shaft 7 extends, in the axial direction of the continuously variable power-split transmission 3 as far as the transmission output 28 and, depending on the respective application at hand, also beyond the drivable vehicle axle arranged in the area of the transmission output 28 in the axial direction of the vehicle drive-train 1. In addition. the transmission input shaft 7 can be brought, in the area of the transmission output 28 in a manner known as such, into functional connection with a so-termed power take-off (PTO) shaft via a PTO transmission, by way of which so-termed attachment devices of the vehicle made with the vehicle drive-train 1 can be acted upon by or supplied with torque from the drive machine 2.

The second shaft 9 of the variator 5 is in the present case functionally connected via a gearwheel 29 connected in a rotationally fixed manner to the second shaft W12 of the first planetary gearset P1 and a fixed wheel 30 of the second shaft 9 of the variator 5 that meshes with it. In addition, the second shaft W22 of the second planetary gearset P2, which shaft is in the form of a ring gear, can be made rotationally fixed or fixed to the housing by means of a shifting element B in the form of a brake when the shifting element B is in its closed operating condition.

In the example embodiment of the power-split transmission 3 shown in FIG. 1, the variator 5 is in the form of a hydraulic variator that comprises two hydraulic machines HM1 and HM2. The displacement volume of the first hydraulic machine HM1 is constant, whereas the displacement volume of the second hydraulic machine HM2 can be varied. In addition the two hydraulic machines HM1 and HM2 can be operated both as pumps and as motors, wherein the mode of operation of the two hydraulic machines HM1 and HM2 changes numerous times between pump operation and motor operation while obtaining the four driving ranges.

To obtain the first driving range, within which the gear ratio of the power-split transmission 3 is highest and by virtue of which the largest traction force can be delivered, the first shifting element K1 and the further shifting element B must be closed whereas the other shifting elements K2 to K4 must be changed to their open operating condition. To be able to engage the second driving range in the power-split transmission 3, which follows on from the first driving range, the two shifting elements K2 and B must be closed, whereas the shifting elements K1, K3 and K4 must be changed to or kept in their open operating condition.

The third driving range in the power-split transmission 3, which in turn follows on from the second driving range, is engaged when the two shifting elements K2 and K3 are closed and the shifting elements K1, K4 and B are in their open operating condition. The fourth driving range, which follows on from the third driving range, is then engaged in the power-split transmission 3 when the shifting elements K1, K3 and B are open and the shifting elements K2 and K4 are closed at the same time. The vehicle made with the vehicle drive-train 1 is operated in the forward driving direction regardless of which of the four driving ranges in the power-split transmission 3 is engaged, when the driving-direction clutch KV is closed and the driving-direction clutch KR is open. In contrast, such a vehicle is operated in the reverse driving direction when the driving-direction clutch KR is closed and the other driving-direction clutch KV is open.

The first planetary gearset P1, the shifting elements K1 to K4, the second planetary gearset P2, the shifting element B and the driving-direction clutches KV and KR are in the present case all arranged coaxially with one another on the transmission input shaft 7, so that in the radial direction the power-split transmission 3 demands little fitting space.

Furthermore, the first planetary gearset P1 comprises a stepped planetary gear assembly. In this case the first shaft W11 of the first planetary gearset P1 is connected to a sun gear SR1 of the stepped planetary gear assembly. The second shaft W12 of the first planetary gearset P1 is functionally connected to a ring gear HR of the stepped planetary gear assembly, while the third shaft W13 of the first planetary gearset P1 is coupled to a planetary carrier PT of the stepped planetary gear assembly, on which stepped planetary gearwheels PR are mounted to rotate. The fourth shaft W14 of the first planetary gearset P1 is connected to a further sun gear SR2 of the stepped planetary gear assembly.

The stepped planetary gearwheels PR mesh in a larger diameter area PR2 with the ring gear HR and the further sun gear SR2, whose diameter is smaller than the diameter of the sun gear SR1. Moreover, the planetary gearwheels PR engage in an area of smaller diameter PR1 with the sun gear SR1.

FIGS. 2 to 26 show representations corresponding to FIG. 1, of further example embodiments of the vehicle drive-train 1, each differing from one another essentially only in the area of the continuously variable power-split transmission 3 and having different arrangements of the individual assemblies of the power-split transmission 3. For that reason, in the following description of the various example embodiments according to FIGS. 2 to 26, in each case only the differences between the example embodiments described in what follows and the example embodiment shown in FIG. 1 will be discussed in greater detail. As regards the further functional modes of the various example embodiments of the vehicle drive-train 1, reference should be made to the description of FIG. 1.

Figure 2:
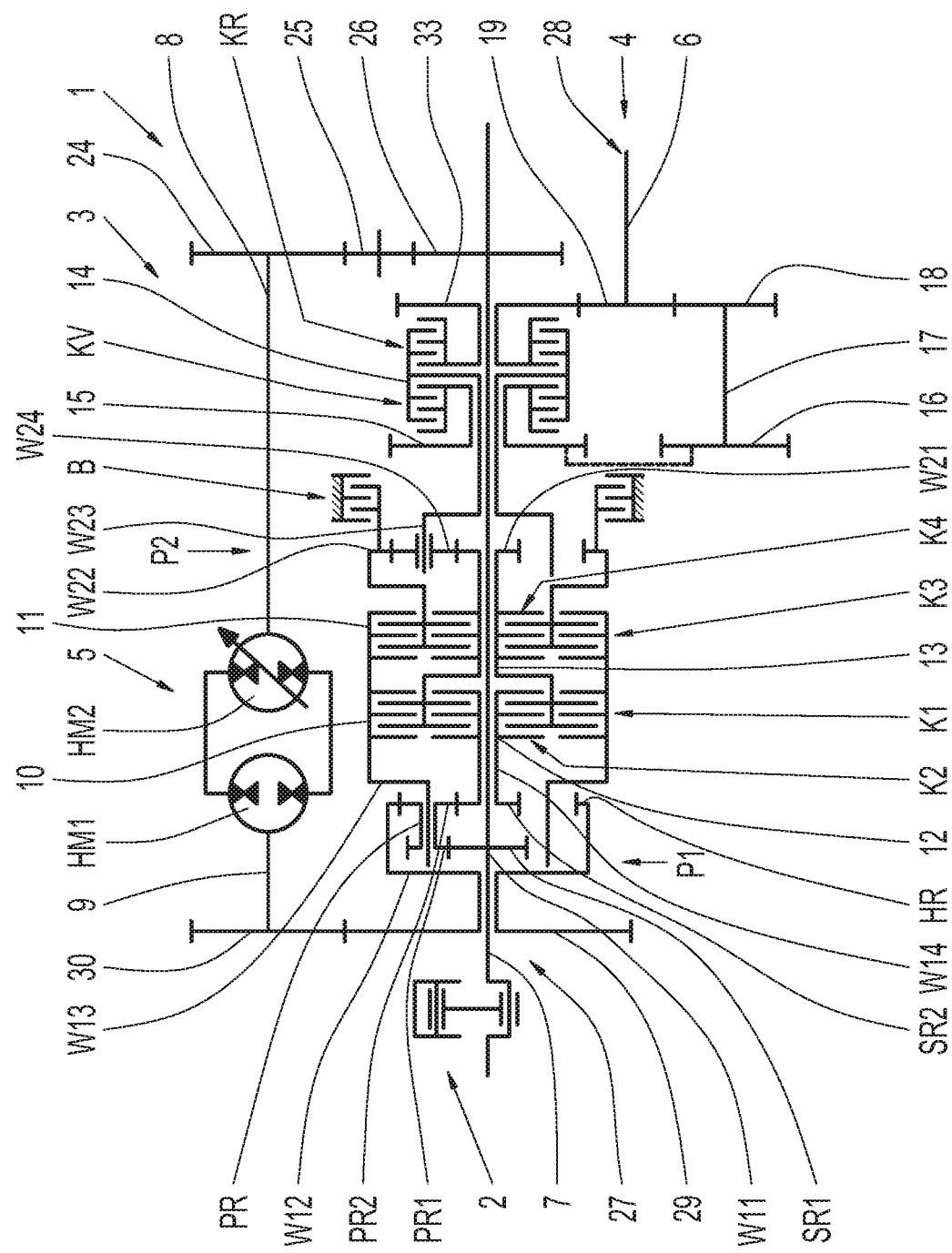

In the example embodiment shown in FIG. 2, the shifting element half 78 on the transmission output side of the fourth shifting element K4 is made integrally with the shifting element half on the transmission output side of the third shifting element K3, which is coupled to the second shaft W22 of the second planetary gearset P2.

Figure 3:
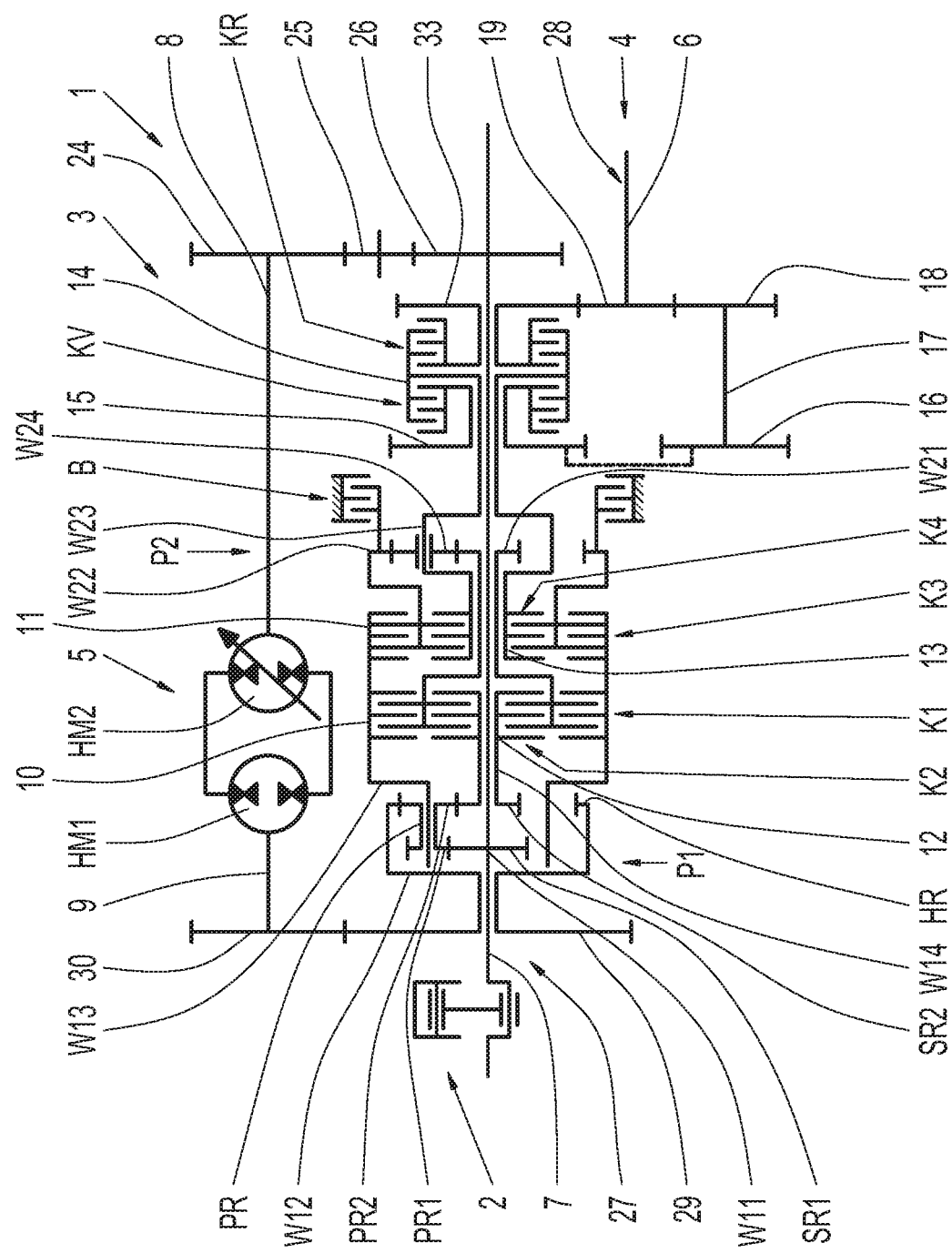

In contrast to the two embodiments of the power-split transmission 3 shown in FIGS. 1 and 2, in the vehicle drive-train 1 according to FIG. 3 the shifting element half 13 of the fourth shifting element K4 is connected to the third shaft W23 of the second planetary gearset P2. In addition the fourth shifting element K4 is made as described in FIG. 2 and, like the third shifting element K3, is functionally connected by its second shifting element half to the second shaft W22 of the second planetary gearset P2.

Figure 4:
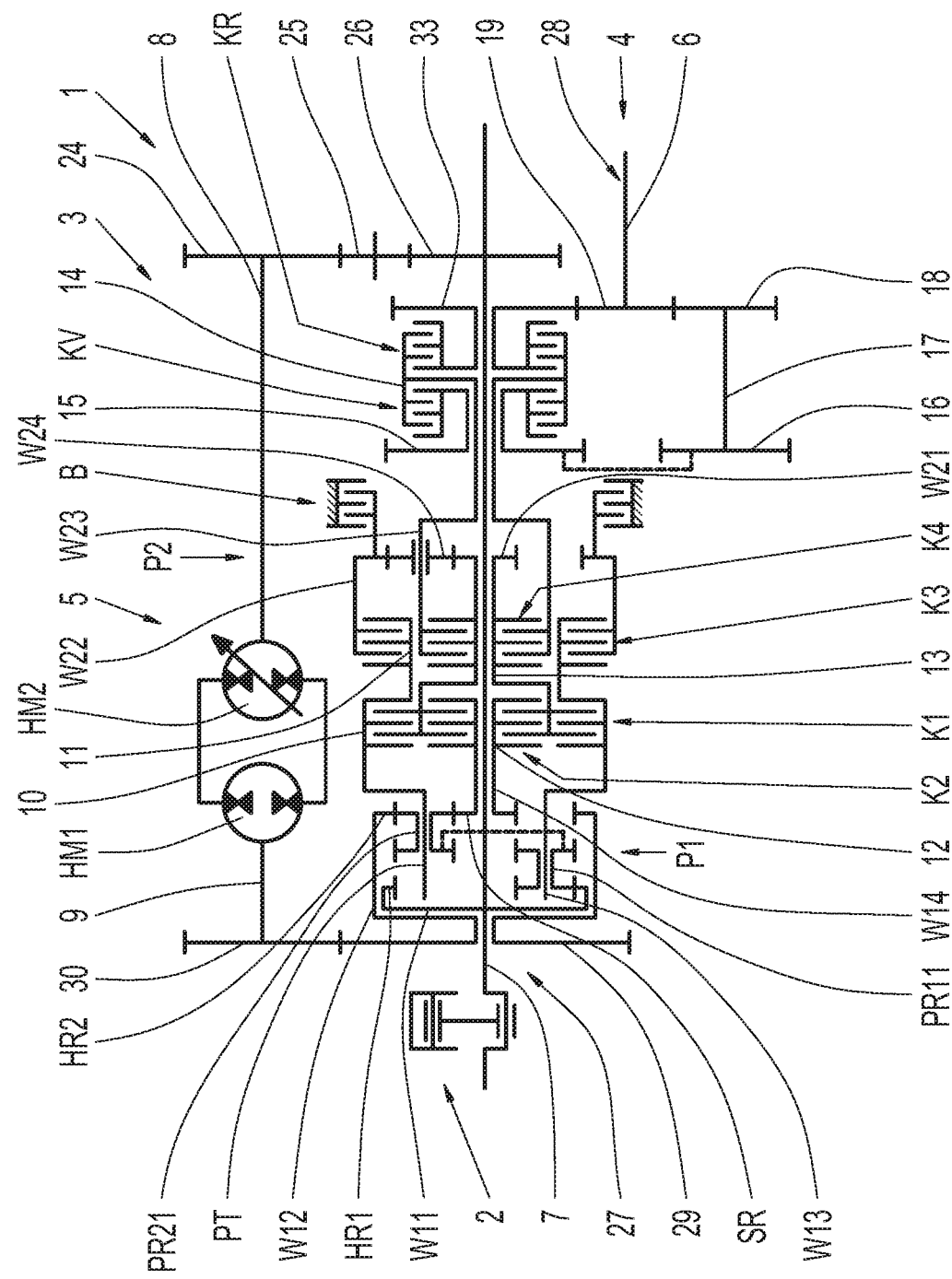

The example embodiment of the vehicle drive-train 1 shown in FIG. 4 is in the area of the continuously variable power-split transmission 3 formed with a first planetary gearset P1 which comprises two ring gears HR1 and HR2, a sun gear SR and a planetary carrier PT. On the planetary carrier PT planetary gearwheels PR11, PR21 are mounted to rotate. In this case the first planetary gearwheels PR11 mesh with one ring gear HR1 and with the second planetary gearwheels PR21, while the second planetary gearwheels PR21 engage with the second ring gear HR2 and the sun gear SR. For this the planetary gearwheels PR11 and PR21 are arranged offset relative to one another in the axial direction of the transmission input shaft 7 and are in essence identically designed. Furthermore, the planetary gearwheels PR11 and PR21 can preferably be mounted to rotate on the planetary carrier PT on the same diameter and can preferably be made with the same number of teeth, so that then the ring gears HR1 and HR2 will also have the same number of teeth.

The first shaft W11 of the first planetary gearset P1 is connected to the first ring gear HR1. The second shaft W12 of the first planetary gearset P1 is coupled rotationally fixed to the other ring gear HR2, while the third shaft W13 of the first planetary gearset P1 is connected rotationally fixed to the planetary carrier PT. The fourth shaft W14 of the first planetary gearset P1 is in turn connected to the sun gear SR. In the first planetary gearset P1 shown in FIG. 4, the planetary gearwheels PR11 and PR21 can be made more simply from a production-technological standpoint than in the stepped planetary gearset according to FIG. 1.

Figure 5A:
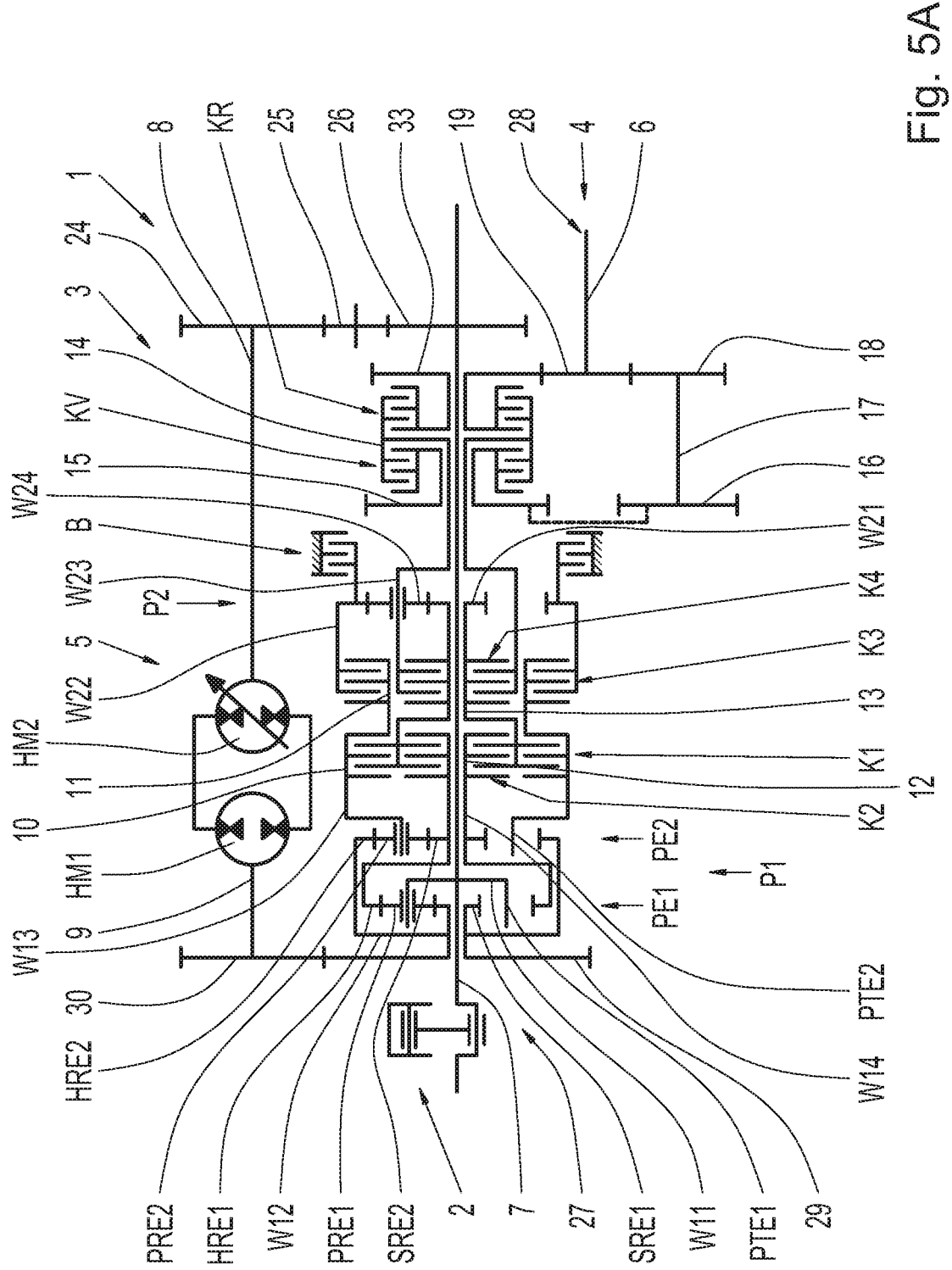

The first planetary gearset P1 of the example embodiment of the vehicle drive-train 1 shown in FIG. 5A comprises two simple planetary gear assemblies PE1 and PE2, each of them made, respectively, with a ring gear HRE1 and HRE2, a planetary carrier PTE1 and PTE2 with planetary gearwheels PRE1 and PRE2 arranged to rotate on them, and a sun gear SRE1 and SRE2. The first shaft W11 of the first planetary gearset P1 is connected to the planetary carrier PTE1 of the first simple planetary gear assembly PE1. The second shaft W12 of the first planetary gearset P1 is functionally connected to the sun gear SRE1 of the first simple planetary gear assembly PE1 and to the ring gear HRE2 of the second simple planetary gear assembly PE2. In addition the third shaft W13 of the first planetary gearset P1 is functionally connected to the planetary carrier PTE2 of the second simple planetary gear assembly PE2. Furthermore, the fourth shaft W14 of the first planetary gearset P1 is coupled to the sun gear SRE2 of the second simple planetary gear assembly PE2 and to the ring gear HRE1 of the first simple planetary gear assembly PE1. In turn, this embodiment of the first planetary gearset P1 can be produced more simply by comparison with the first planetary gearset P1 shown in FIG. 1 and made with a stepped planetary gearset.

Figure 5B:
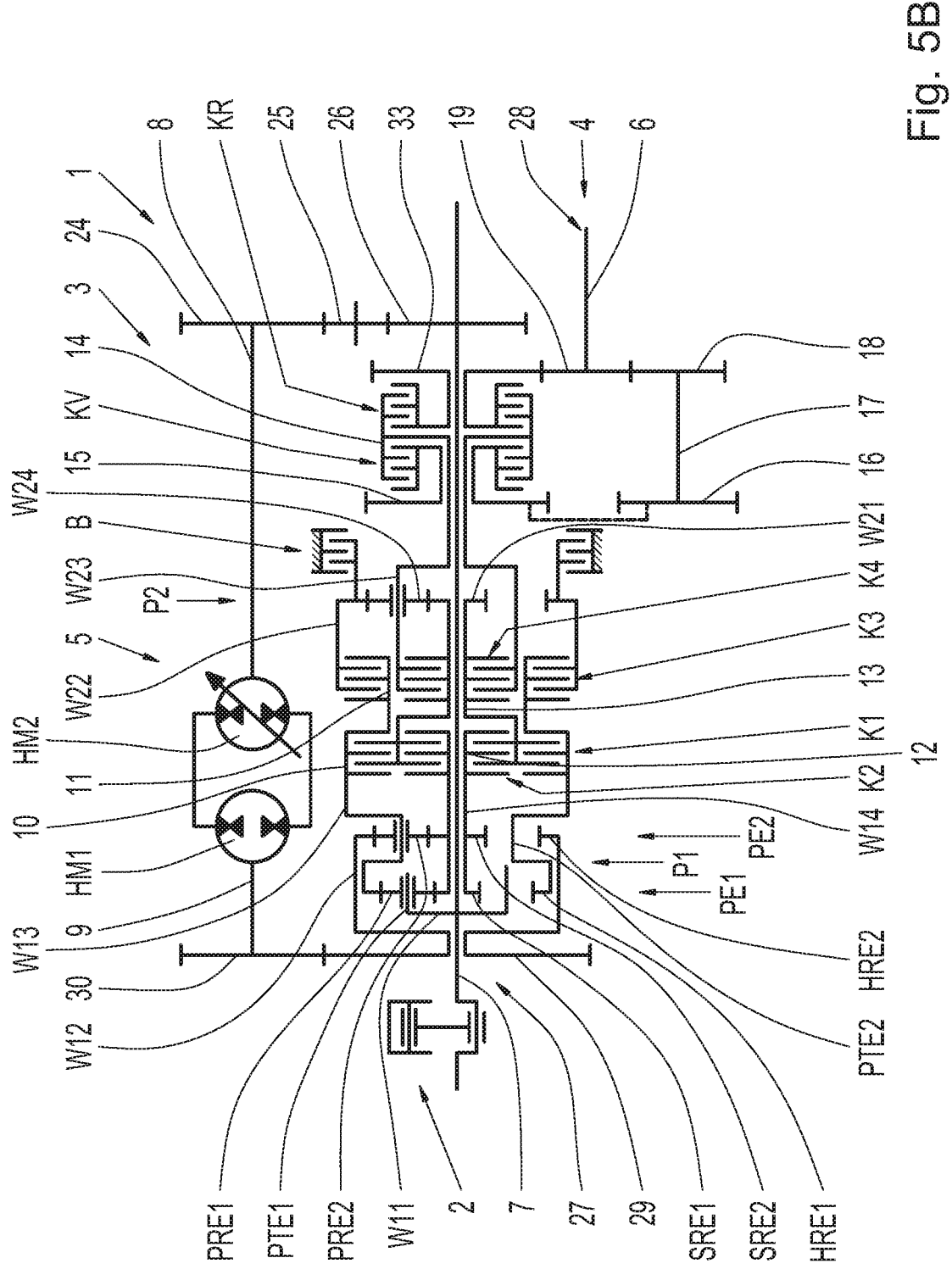

The vehicle drive-train 1 shown in FIG. 5B is made with a further variant of the first planetary gearset P1 in the area of the power-split transmission 3. As in the first planetary gearset P1 shown in FIG. 5A, in this case the first planetary gearset P1 comprises two simple planetary gear assemblies PE1, PE2, each respectively with a ring gear HRE1, HRE2, each with a planetary carrier PTE1, PTE2 and each with a sun gear SRE1, SRE2, The first shaft W11 of the first planetary gearset P1 is connected to the planetary carrier PTE1 of the first simple planetary gear assembly PE1. The second shaft W12 of the first planetary gearset P1 is functionally connected to the ring gear HRE2 of the second simple planetary gear assembly PE2. Furthermore, the third shaft W13 of the first planetary gearset P1 is connected to the planetary carrier PTE2 of the second simple planetary gear assembly PE2 and to the ring gear HRE1 of the first simple planetary gear assembly PE1. In addition the fourth shaft W14 of the first planetary gearset P1 is coupled to the sun gear SRE2 of the second simple planetary gear assembly PE2 and to the sun gear SRE1 of the first simple planetary gear assembly PE1.

Figure 6:
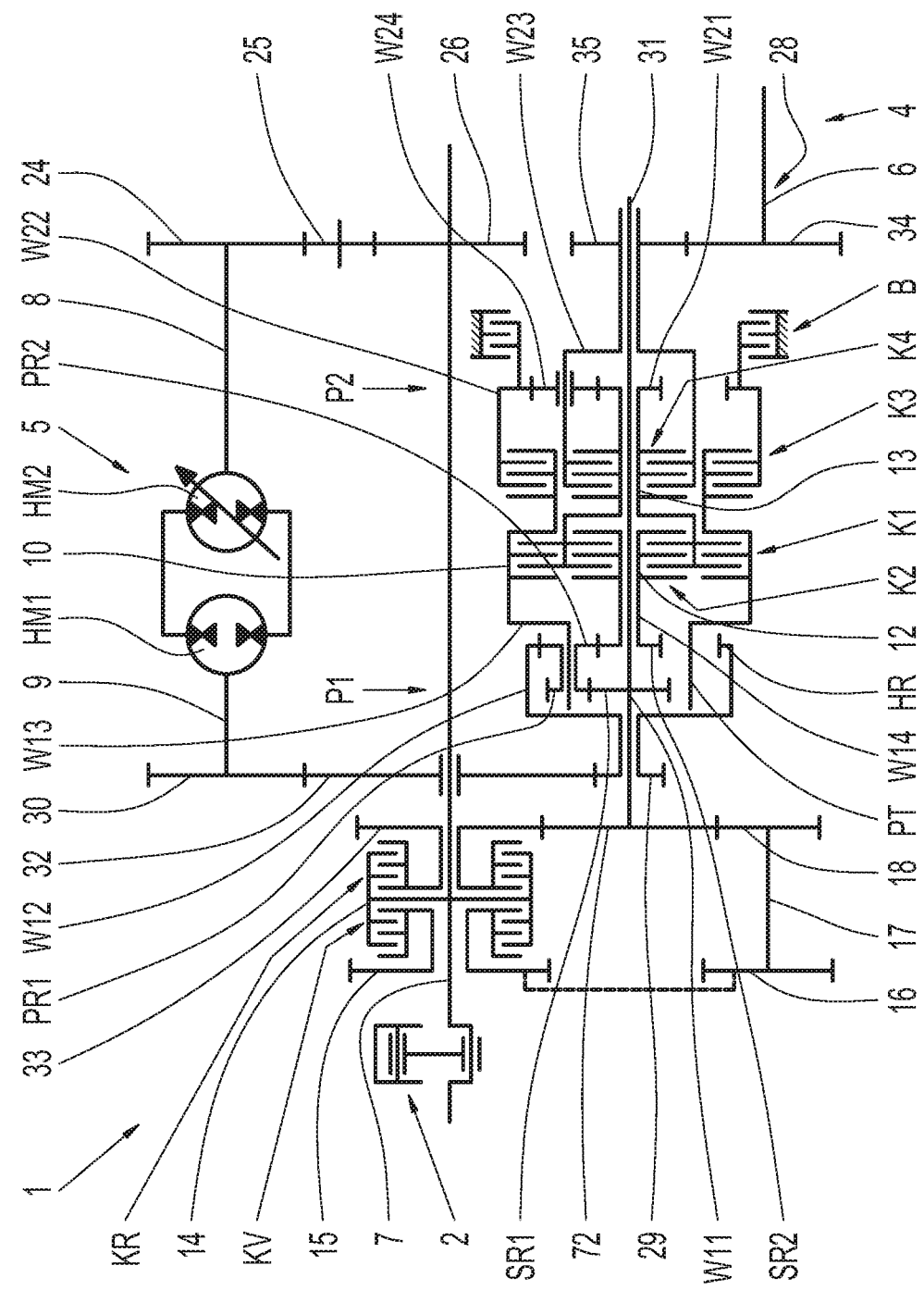

The example embodiment of the vehicle drive-train 1 shown in FIG. 6 comprises essentially the same components as the vehicle drive-train 1 shown in FIG. 1. The first shaft W11 of the first planetary gearset P1 is functionally connected by way of the driving-direction clutches KV and KR to the transmission input shaft 7, whereas the second shaft W23 of the second planetary gearset P2 is permanently connected to the drive output 6. In this case the driving-direction clutches KV and KR of the continuously variable power-split transmission 3 according to FIG. 6, in the area of the transmission input 27, are arranged coaxially on the transmission input shaft 7, while the first planetary gearset P1, the shifting elements K1 to K4 and B are arranged coaxially with one another on a countershaft 31 a radial distance away from the transmission input shaft 7. Furthermore, the second shaft W12 of the first planetary gearset P1 is functionally connected, by way of a loose wheel 32 that meshes with the gearwheel 29 and is mounted to rotate on the transmission input shaft 7, to the second shaft 9 of the variator 5, which in turn engages with the fixed wheel 30 of the second shaft 9 of the variator 5.

In the embodiment of the vehicle drive-train 1 shown in FIG. 6, the loose wheels 15 and 33 can each be connected rotationally fixed to the transmission input shaft 7 by means of the driving-direction clutches KV and KR, in order to be able to drive the transmission output shaft 6 in the same rotational direction as the transmission input shaft 7 or in a rotational direction different therefrom.

For that purpose the loose wheel 33 and the fixed wheel 18 mesh with a fixed wheel 72 connected to the countershaft 31 in a rotationally fixed manner. The countershaft 31 can be coupled to the transmission output shaft 6 by way of the first planetary gearset P1, the shifting elements K1 to K4 and the second planetary gearset P2. In this case the transmission output shaft 6 is functionally connected, via a fixed wheel 34 and a fixed wheel 35 of the third shaft 23 of the second planetary gearset P2 that meshes with it, to the third shaft 23 of the second planetary gearset P2.

Figure 7:
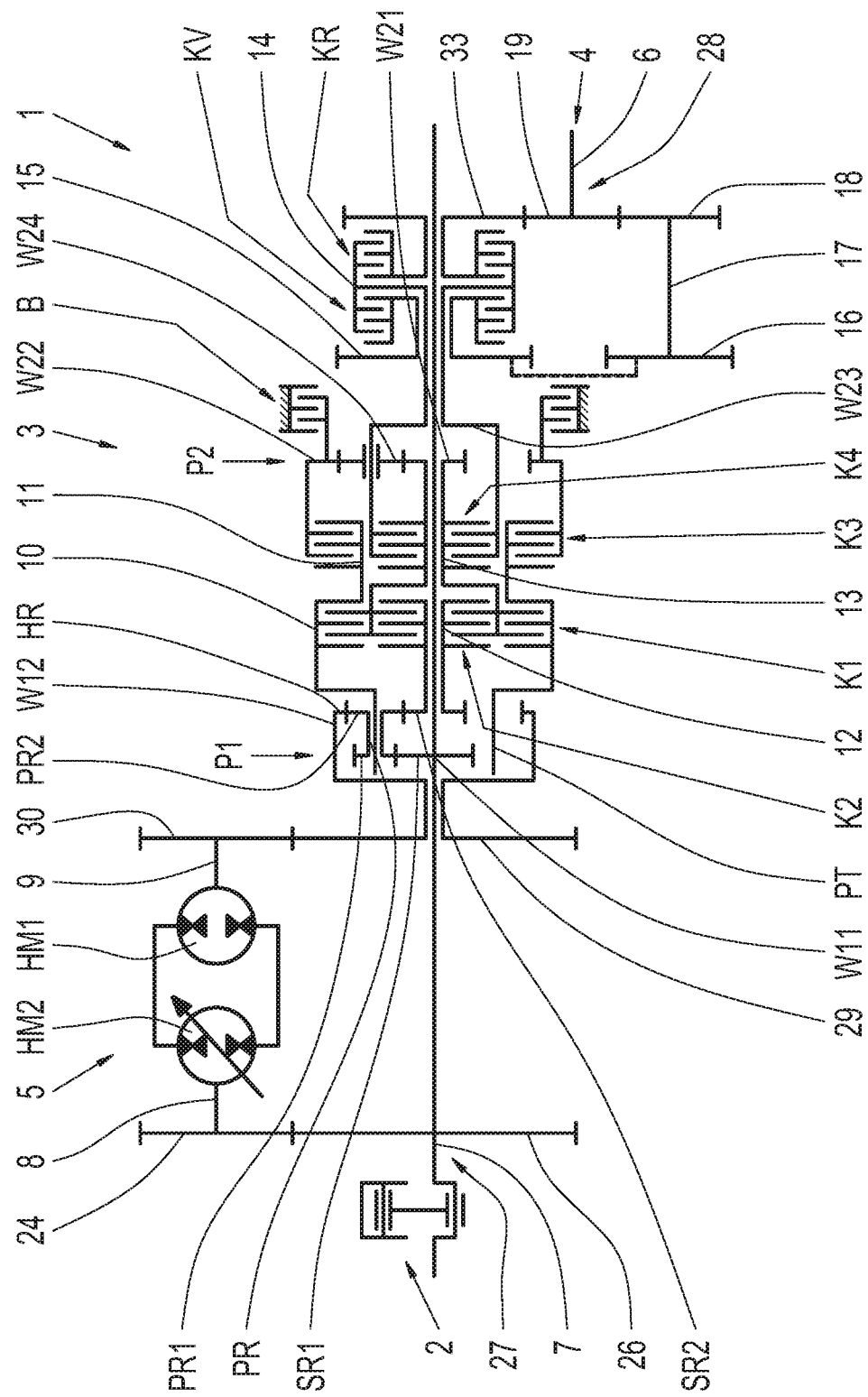

FIG. 7 shows an embodiment characterized by occupying little fitting space, in which embodiment the structure and arrangement of the first planetary gearset P1, the shifting elements K1 to K4 and B, and the driving-direction clutches KV and KR correspond to those of the example embodiment shown in FIG. 1. The variator 5 is arranged in the area of the transmission input 27, in the axial direction between the drive machine 2 and the first planetary gearset P1. In addition the variator 5, in the area of its first shaft 8, is functionally connected on the side facing toward the drive machine 2 to the transmission input shaft 7 by way of the fixed wheel 24 and the fixed wheel 26 that meshes directly with it. Moreover, the variator 5 is functionally connected, via its second shaft 9 on its side facing toward the first planetary gearset P1, with the second shaft W12 of the first planetary gearset P1 by way of the fixed wheel 30 and the gearwheel 29 that meshes with it.

Figure 8:
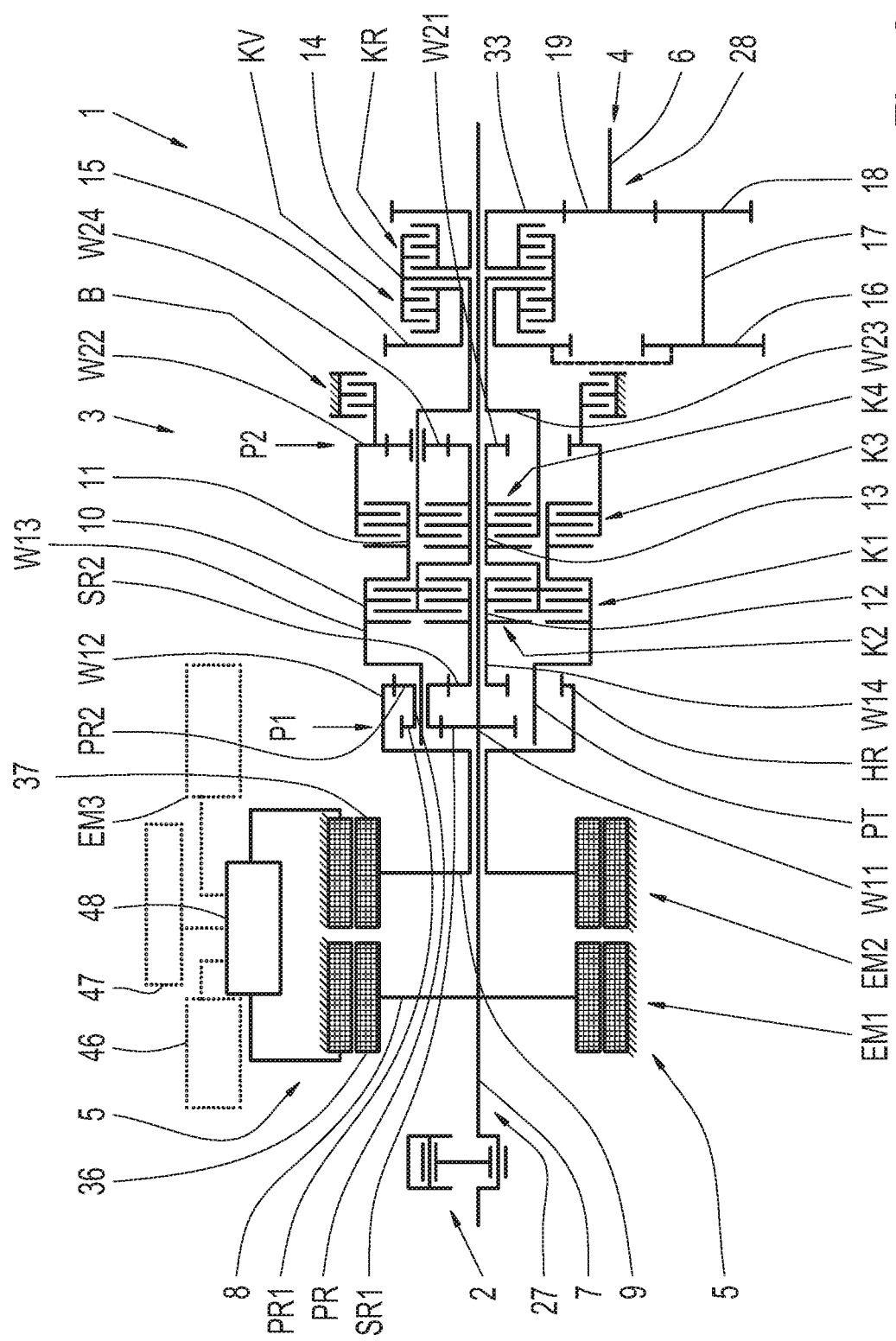

In the example embodiment of the vehicle drive-train 1 shown in FIG. 8, the variator 5 is an electric variator comprising two machines EM1 and EM2 which can both be operated as motors or as generators. The arrangement and configuration of the planetary gearset P1, the shifting elements K1 to K4 and B, and the driving-direction clutches KV and KR correspond to those in the example embodiment of the continuously variable power-split transmission 3 shown in FIG. 1. The two electric machines EM1 and EM2 are arranged in the area of the transmission input 27 and the axial direction of the transmission input shaft 7 between the drive machine 2 and the first planetary gearset P1, coaxially with the transmission input shaft 7. In this case a rotor 36 of the first electric machine EM1 is connected directly to the transmission input shaft 7, whereas a rotor 37 of the second electric machine EM2 is coupled rotationally fixed to the second shaft W12 of the first planetary gearset P1.

Basically, when the variator 5 is made as an electric variator the possibility exists of supplying electrical energy to other electric consumers, such as an additional electric machine EM3, an additional electric accumulator 46 and an on-board electric system 47, in a simple manner by means of an appropriate regulation and control system 48. In such a case the regulation and control ability can be better realized by comparison with a hydraulic variator.

In addition the possibility exists, that during operation in the motor mode by virtue of the on-board electric accumulator 46 and/or via an external current supply such as a power network or the like, the electric machines EM1 and EM2 can be supplied with electrical energy. For that purpose a vehicle can for example be made with a corresponding interface such as a power socket and/or a plug, in order to be able to connect the vehicle or its electric machines EM1, EM2 to the external power source to the desired extent.

Figure 9:
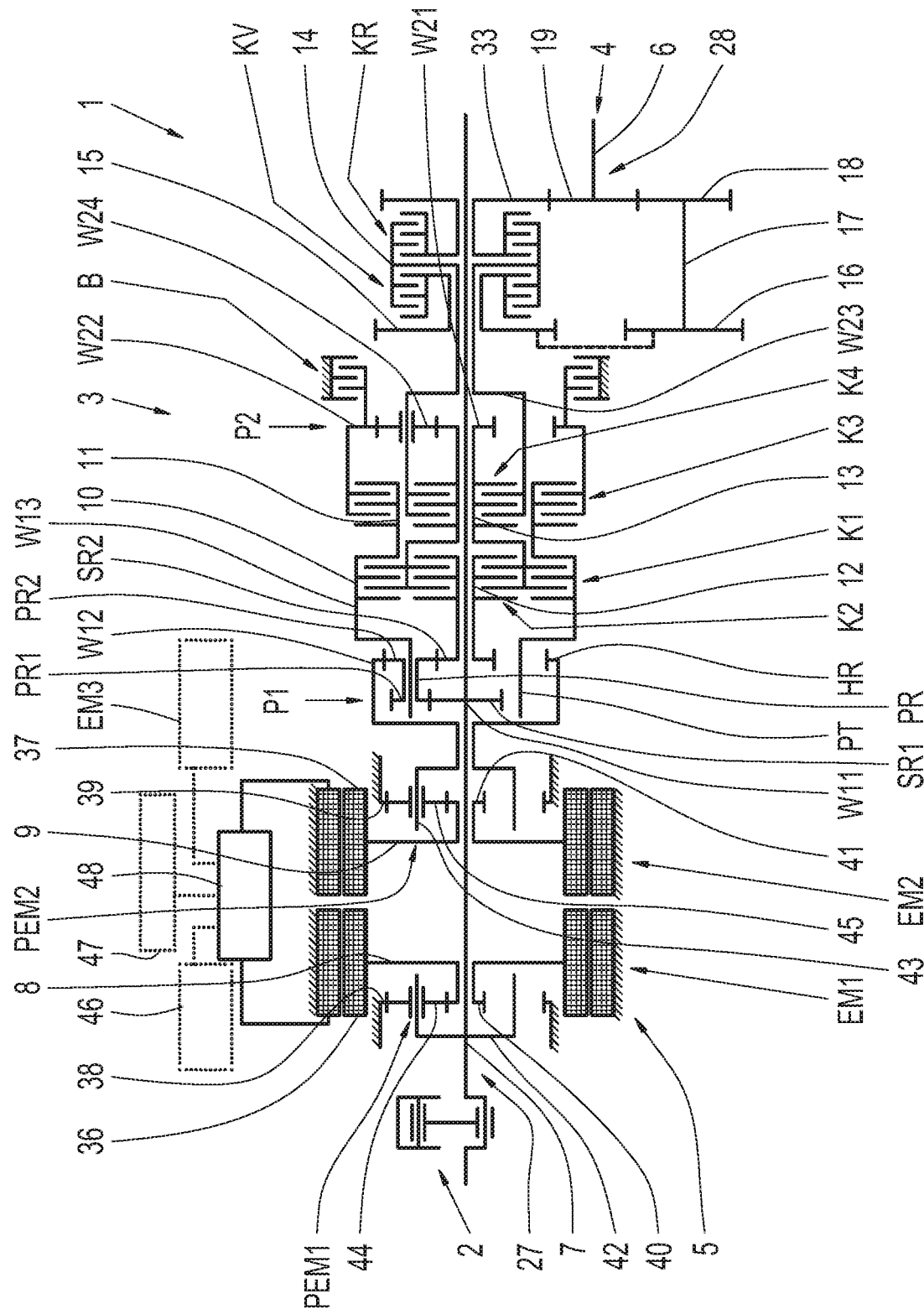

The further example embodiment of the vehicle drive-train 1 shown in FIG. 9 differs from the example embodiment of the vehicle drive-train 1 shown in FIG. 8 only in the area of the connection of the two electric machines EM1 and EM2 of the variator 5 to the transmission input shaft 7 and to the second shaft W12 of the first planetary gearset P1. In this case the two electric machines EM1 and EM2, respectively, are functionally connected via a planetary gearset PEM1 and PEM2 to the transmission input shaft 7 and to the second shaft W12 of the first planetary gearset P1, which can be arranged inside the electric machines EM1 and EM2 in a fitting-space-neutral manner. The two planetary gearsets PEM1 and PEM2 are in the form of simple planetary gear assemblies and comprise in each case a ring gear 38 or 39 fixed to the housing, a sun gear 40 or 41 connected rotationally fixed to the rotor 36 or 37, and in each case a planetary carrier 42 or 43. The planetary gearset PEM1 associated with the first electric machine EM1 is connected rotationally fixed to the transmission input shaft 7 by way of the planetary carrier 42. The planetary gearset PEM2 associated with the second electric machine EM2 is functionally connected via its planetary carrier 43 to the second shaft W12 of the first planetary gearset P1.

Compared with the direct connection to the transmission input shaft 7 and the second shaft W12 of the first planetary gearset P1, shown in FIG. 8, the connection of the two electric machines EM1 and EM2 via the planetary gearsets PEM1 and PEM2 provides the possibility of operating the electric machines EM1 and EM2 with greater efficiency, since due to the gear ratio of the planetary gearsets PEM1 and PEM2 the electric machines can be operated at higher rotational speeds with the same drive input rotational speed of the drive machine. 2 This has the advantage that by comparison with direct connection, the electric machines EM1 and EM2 have to produce a lower torque and can therefore be made more compact.

Furthermore, during the operation of the vehicle drive-train 1 while the drive machine 2 is stationary, for example at a rotational speed equal to 2000 r/min, the first electric machine EM1 can be operated at a constant rotational speed which, with a corresponding gear ratio of the planetary gearset PEM1, is for example around 6000 r/min. In contrast, the rotational speed of the second electric machine EM2 in the last-described numerical example is then continuously varied between a first rotational speed, for example −6000 r/min and a second rotational speed, for example +6000 r/min. Thereby, the overall gear ratio of the power-split transmission 3 within the driving range engaged at the time can be changed continuously to the desired extent along with a high efficiency of the electric machines EM1 and EM2.

Compared with a hydraulic variator the electric variator 5 can be operated with greater efficiency, but the electric variator 5 is characterized by lower power density and at present incurs higher manufacturing costs than the use of a hydraulic variator.

Figure 10:
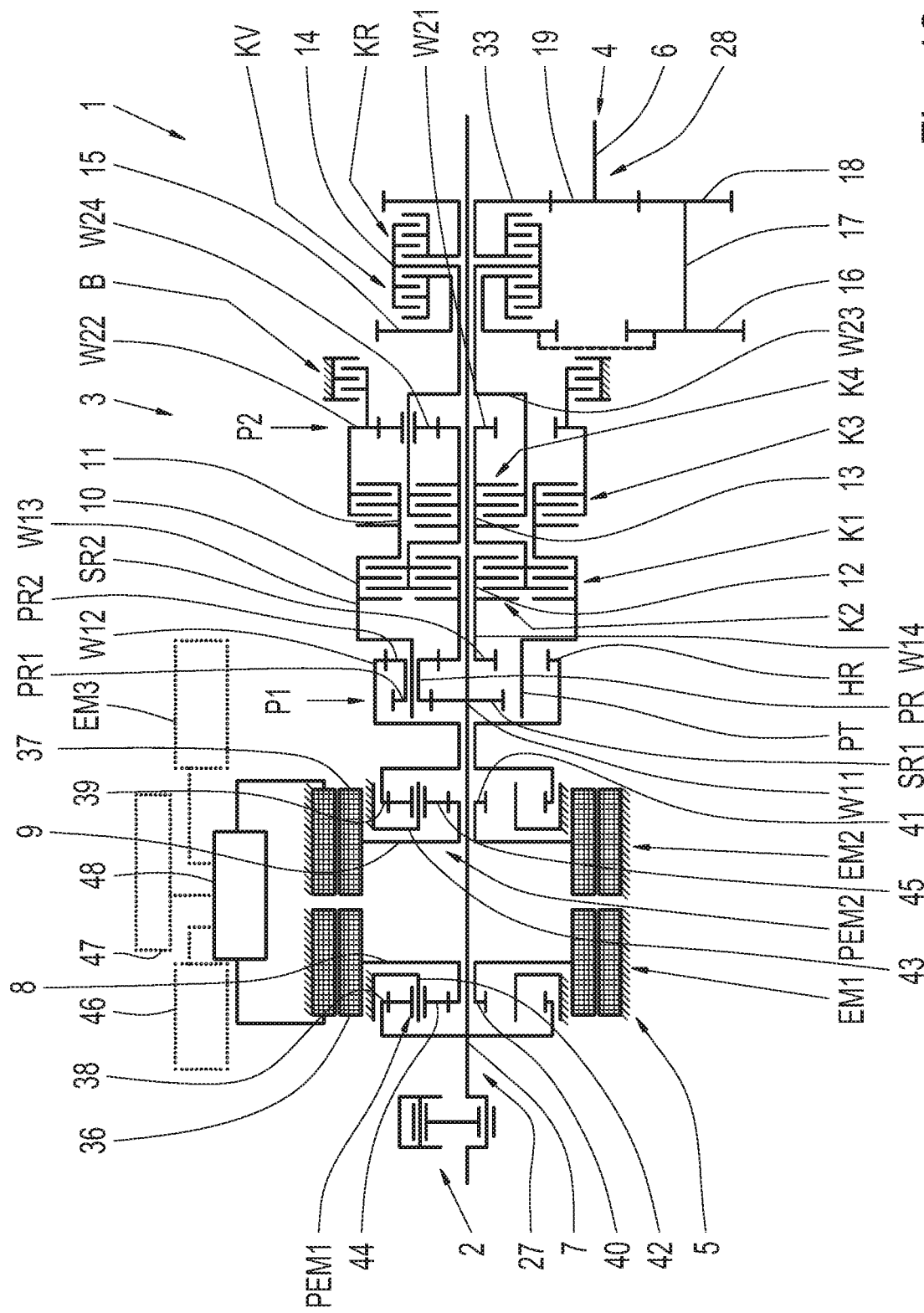

A further example embodiment of the vehicle drive-train 1 is shown in FIG. 10. This example embodiment differs from the example embodiment of the vehicle drive-train 1 shown in FIG. 9, only in the configuration of the two planetary gearsets PEM1 and PEM2 and their coupling to the rotors 36 and 37 of the two electric machines EM1 and EM2, and to the transmission input shaft 7 or to the second shaft W12 of the first planetary gearset P1. The planetary gearsets PEM1 and PEM2 are again arranged radially inside the electric machines EM1 and EM2 in a space-saving manner. The transmission input shaft 7 is connected to the ring gear 38 of the planetary gearset PEM1 associated with the first electric machine EM1, whereas the rotor 36 is coupled rotationally fixed to the sun gear 40. The planetary carrier 42 of the planetary gearset PEM1 is fixed to the housing. At the same time, the planetary carrier 43 of the planetary gearset PEM2 associated with the second electric machine EM2 is fixed to the housing. The rotor 37 of the second electric machine EM2 is connected rotationally fixed to the sun gear 41 of the planetary gearset PEM2, while the ring gear 39 of the planetary gearset PEM2 is coupled to the second shaft W12 of the first planetary gearset P1.

In this embodiment of the two planetary gearsets PEM1 and PEM2, during the operation of the vehicle drive-train 1 no centrifugal forces act upon the planetary gearwheels 44 or 45 arranged to rotate on the planetary carriers, 42 and 43, respectively. Compared with the structure of the vehicle drive-train 1 according to FIG. 9, the gear ratio between the transmission input shaft 7 and the first electric machine EM1 and between the second electric machine EM2 and the second shaft W12 of the first planetary gearset P1 is negative. Moreover, compared with the embodiment of the planetary gearsets PEM1 and PEM2 shown in FIG. 9 the nesting of the planetary gearsets PEM1 and PEM2 of the version shown in FIG. 10, radially inside the electric machines EM1 and EM2, can only be realized at higher cost and with greater complexity.

Figure 11:
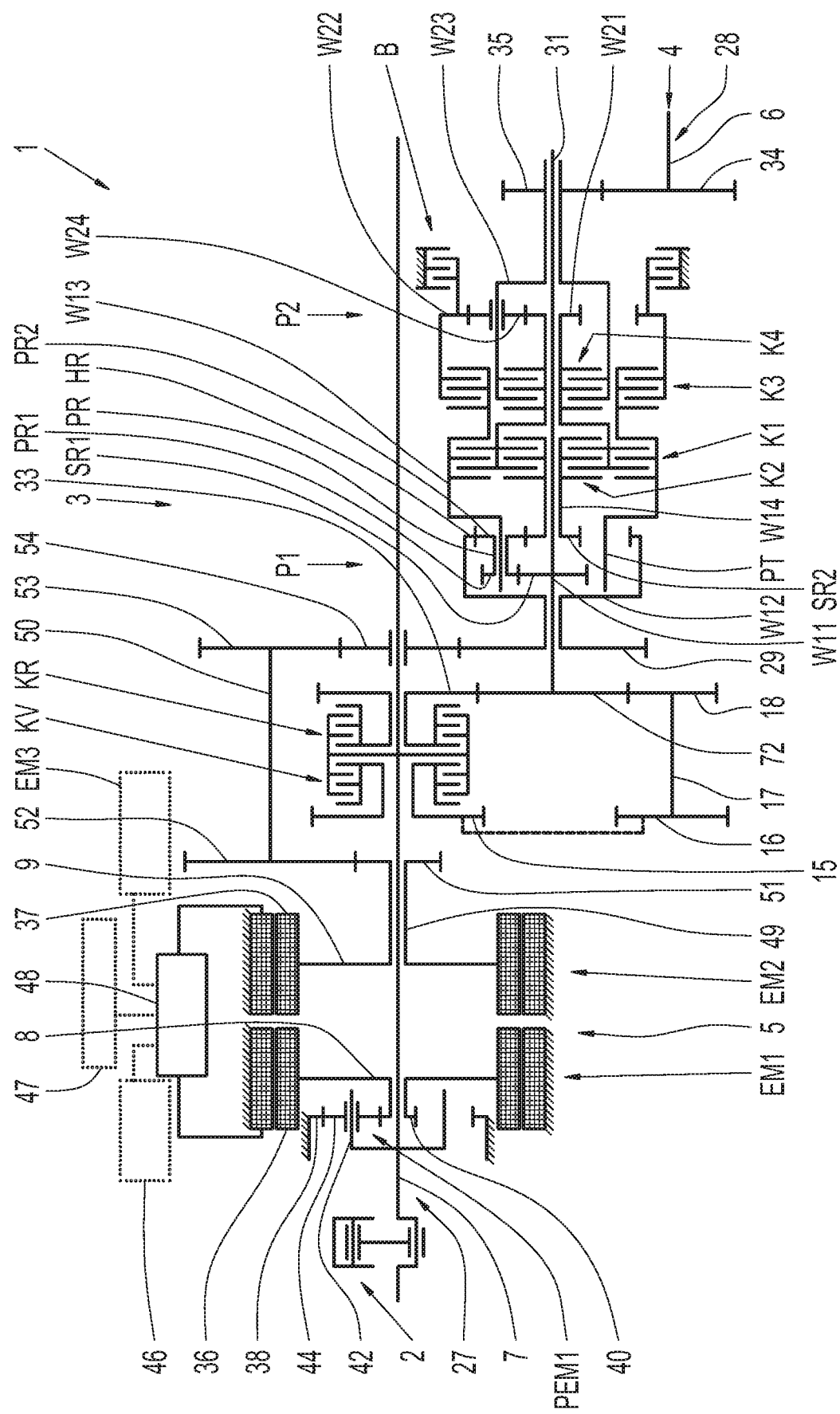

A further example embodiment of the vehicle drive-train 1 is shown in FIG. 11, in which the driving-direction clutches KV and KR, the shifting elements K1 to K4 and B, and the second planetary gearset P2 are arranged in the manner described for FIG. 6, whereas the electric variator 5 is positioned in the manner described for FIGS. 9 and 10, namely on the transmission input side. In this case the first electric machine EM1 again coupled to the transmission input shaft 7 by way of the planetary gearset PEM1, which is configured in the same way as the planetary gearset PEM1 in FIG. 9. The second electric machine EM2 is functionally connected, via a hollow shaft 49 arranged to rotate on the transmission input shaft 7 and via a countershaft 50, to the second shaft W12 of the first planetary gearset P1. In this case a fixed wheel 51 of the hollow shaft 49 meshes with a fixed wheel 52 of the countershaft 50. A further fixed wheel 53 of the countershaft 50 is in turn engaged with a loose wheel 54 arranged to rotate on the transmission input shaft 7. The loose wheel 54 meshes with the gearwheel 29 which is connected rotationally fixed to the second shaft W 12 of the first planetary gearset P1.

Due to the transmission-input-side arrangement of the driving-direction clutches KV and KR, these are again made smaller than if the driving-direction clutches KV and KR had been arranged on the transmission output side. In addition, in the embodiment shown in FIG. 11 the second electric machine EM2 is functionally connected to the first planetary gearset P1 only by spur gear stages. This connection of the second electric machine EM2 has the advantage that it enables the second electric machine EM2 to be operated in its operating range that is best for efficiency, without an additional planetary gear assembly.

Figure 12:
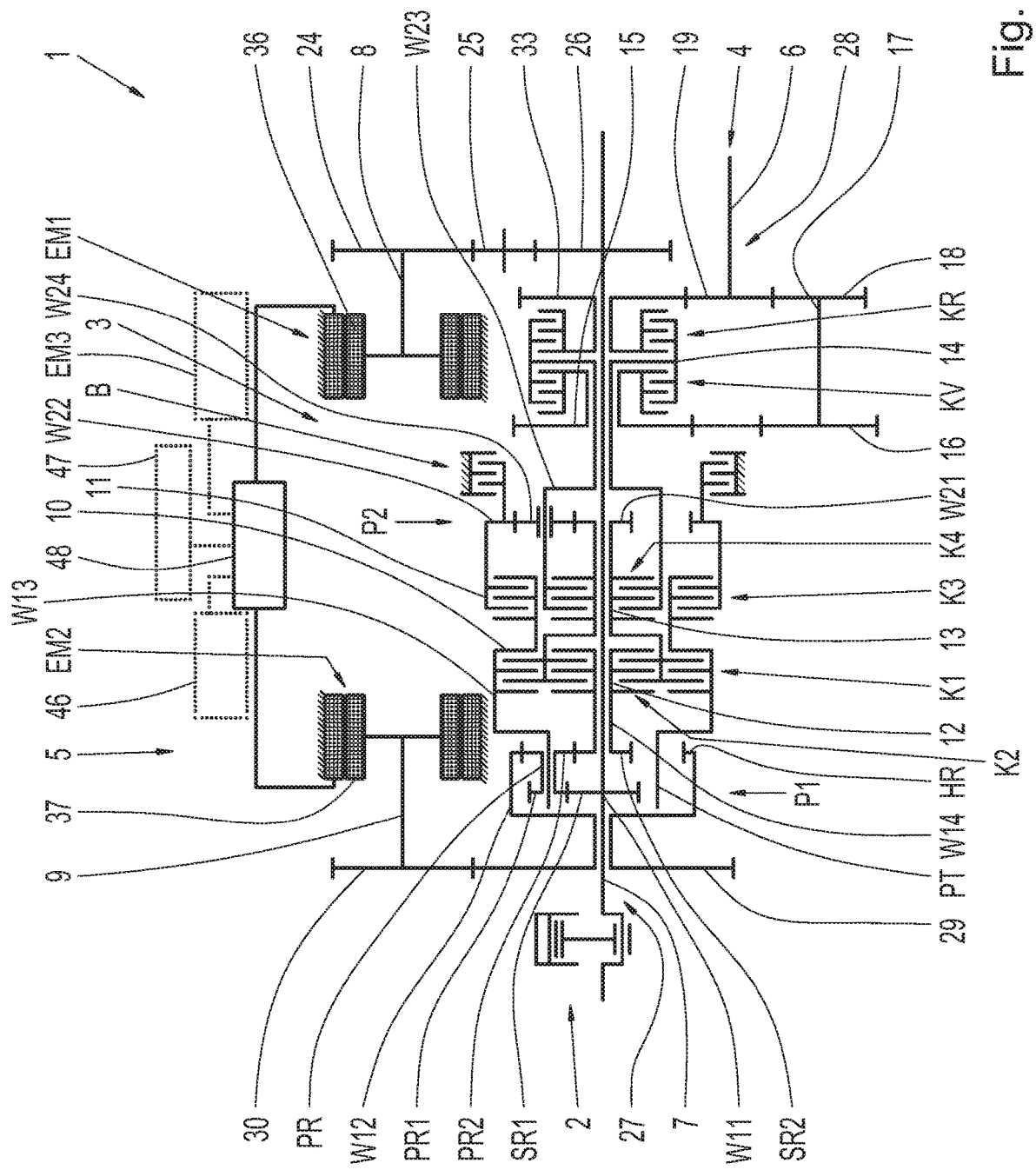

In the example embodiment of the vehicle drive-train 1 shown in FIG. 12, the electric machines EM1 and EM2 of the electric variator 5 are arranged on the same side as the variator 5 of the vehicle drive-train 1 according to FIG. 1. Furthermore, the electric machines EM1 and EM2 of the variator 5 in FIG. 12, compared with the electric machines EM1 and EM2 shown in FIGS. 9 to 11, are longer in the axial direction and made with a smaller diameter, so that the radial fitting space needed for the power-split transmission 3 according to FIG. 12 is limited.

In the embodiment of the vehicle drive-train 1 shown in FIG. 12 the possibility exists, for example, of driving pumps of a working hydraulic system and/or a vehicle steering system by means of a gearwheel arranged close to a housing wall, such as the fixed wheel 24 or the fixed wheel 30, in a simply designed manner. Furthermore, the connection of the electric machines EM1 and EM2 of the electric variator 5 via the fixed wheels 26, 24 and 29, 30 is cheaper and the electric machines EM1 and EM2 can then also be operated with greater mechanical efficiency than in the case of the connection via the planetary gearsets PEM1 and PEM2.

In contrast to this, the power density of the electric machines EM1 and EM2 used in the example embodiments according to FIGS. 9, 10 and 11, which are also called disk machines, is higher than the power density of the electric machines EM1 and EM2 according to FIG. 12, which are axially longer and radially slimmer.

Figure 13:
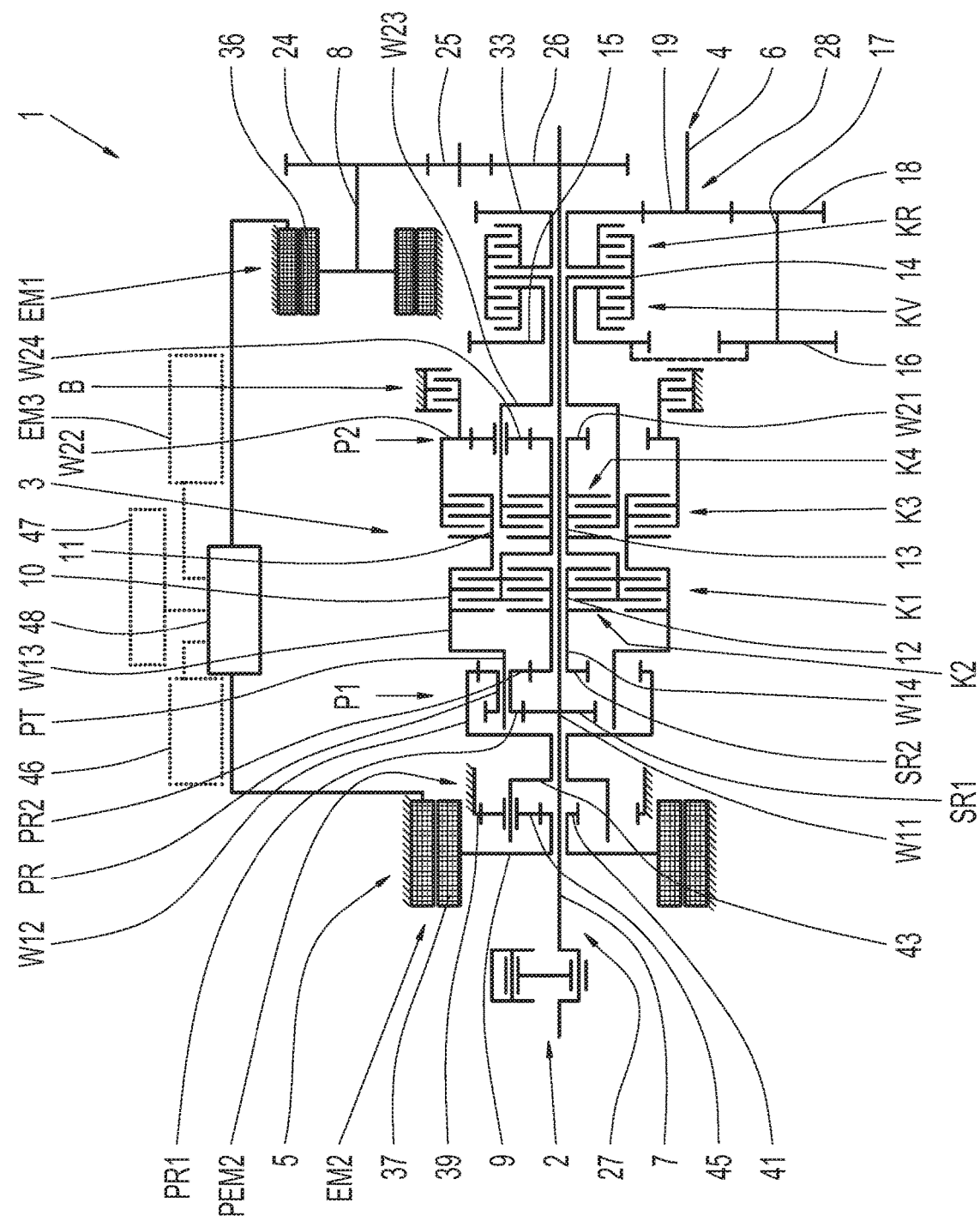

In the embodiment of the vehicle drive-train 1 shown in FIG. 13, the second electric machine EM2 of the electric variator 5 is arranged in the manner described in the case of FIG. 9 and is connected to the second shaft W12 of the first planetary gearset P1 by way of the planetary gearset PEM2.

The first electric machine EM1 of the electric variator 5 is arranged as described in FIG. 12 and is functionally connected to the transmission input shaft 7 in the same way as the second electric machine EM2 in FIG. 12.

Figure 14:
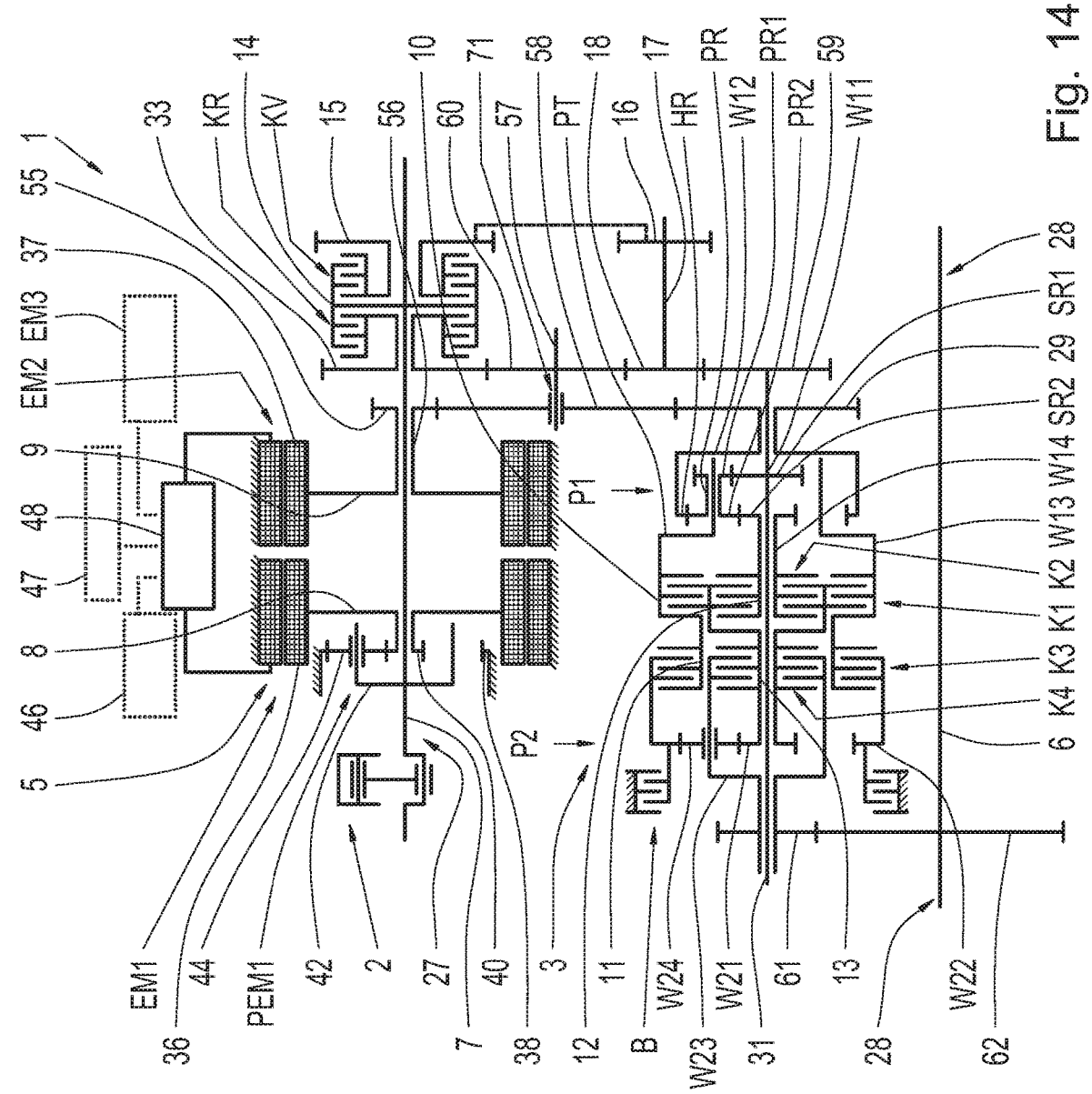

An example embodiment characterized by occupying little fitting space in the axial direction is shown in FIG. 14. In this case the two electric machines EM1 and EM2 and the driving-direction clutches KV and KR are arranged coaxially with one another and on the transmission input shaft 7. The first planetary gearset P1 and the second planetary gearset P2 and the shifting elements K1 to K4 and B are arranged on the countershaft 31 radially a distance away from the transmission input shaft 7 and are positioned essentially radially next to the electric variator 5. The first electric machine EM1 is functionally connected to the transmission input shaft 7 by way of a planetary gearset PEM1 described in greater detail in connection with FIG. 9. The second electric machine EM2 is coupled to the second shaft W12 of the first planetary gearset P1 by means of a gear chain 71. In the present case the gear chain 71 comprises a fixed wheel 55 of a ring gear 56 connected to the rotor 37 of the second electric machine EM2, which is mounted to rotate on the transmission input shaft 7. The fixed wheel 55 meshes with a loose wheel 58 mounted to rotate on a further countershaft 57, which wheel 58 in turn engages with the fixed wheel 29.

In addition the transmission input shaft 7 can be connected in a rotationally fixed manner by means of the driving-direction clutch KV to the loose wheel 15, which meshes with the fixed wheel 18 of the countershaft 17. The further fixed wheel 18 of the countershaft 17 engages with a fixed wheel 59 of the countershaft 31, so that a torque applied to the transmission input shaft 7 can be transmitted to the countershaft 31 by way of the gear chain comprising the driving-direction clutch KV and the gearwheels 15, 16, 18 and 59.

If the vehicle made with the vehicle drive-train 1 according to FIG. 14 is to be driven in the reverse driving direction, in the manner described previously the driving-direction clutch KR must be closed and the driving-direction clutch KV must be opened. In such an operating condition of the driving-direction clutches KV and KR the loose wheel 33 is connected by the driving-direction clutch KR to the transmission input shaft 7. The loose wheel 33 meshes with a fixed wheel 60 of the further countershaft 57, which in turn engages with the further fixed wheel 18 of the countershaft 17. As already explained, the further fixed wheel 18 meshes with the fixed wheel 59 of the countershaft 31. The third shaft W23 of the second planetary gearset P2 is in the present case functionally connected to the transmission output shaft 6 by way of a fixed wheel 61 and a fixed wheel 62 of the transmission output shaft 6 which is also in the form of a countershaft.

Depending on the application case at the time, it is also possible that the transmission output shaft 6 is or can be brought into functional connection with one or more drivable vehicle axles by way of further gearwheel stages.

Figure 15:
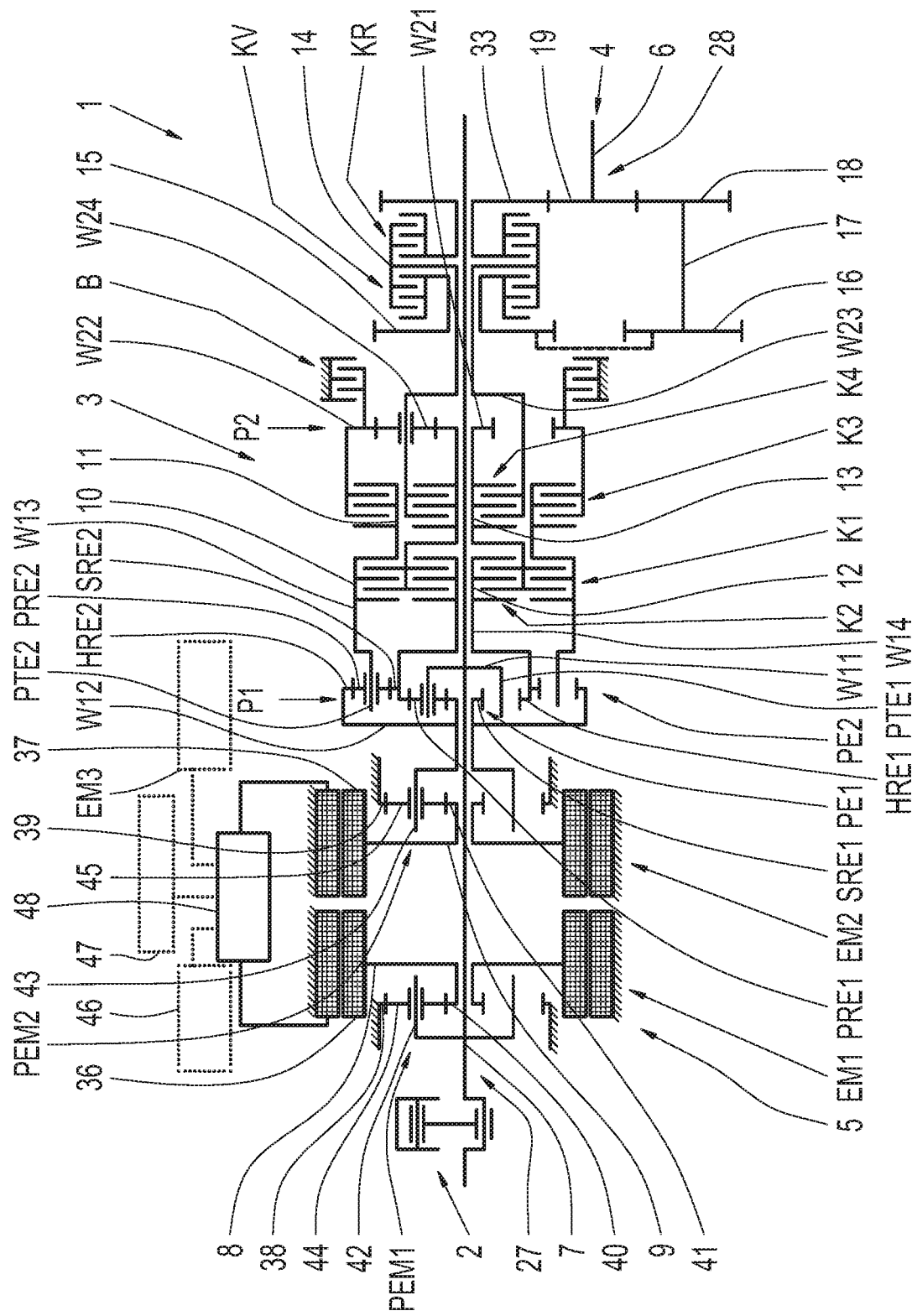

The vehicle drive-train 1 shown in FIG. 15 has a structure essentially corresponding to FIG. 9, wherein, in contrast, the first planetary gearset P1 comprises the two simple planetary gear assemblies PE1 and PE2. In the embodiment of the power-split transmission 3 according to FIG. 15, the first simple planetary gear assembly PE1 is arranged radially inside the second simple planetary gear assembly PE2, so that the power-split transmission 3 according to FIG. 15 takes up less fitting space in the axial direction than does the power-split transmission 3 shown in FIG. 5A. Since the sun gear SRE2 of the second simple planetary gear assembly PE2 and the ring gear HRE1 of the first simple planetary gear assembly PE1 are made integrally, compared with the power-split transmission 3 according to FIG. 5A the power-split transmission 3 according to FIG. 15 is more simply designed and can be made more cheaply since the number of components is smaller.

Figure 16:
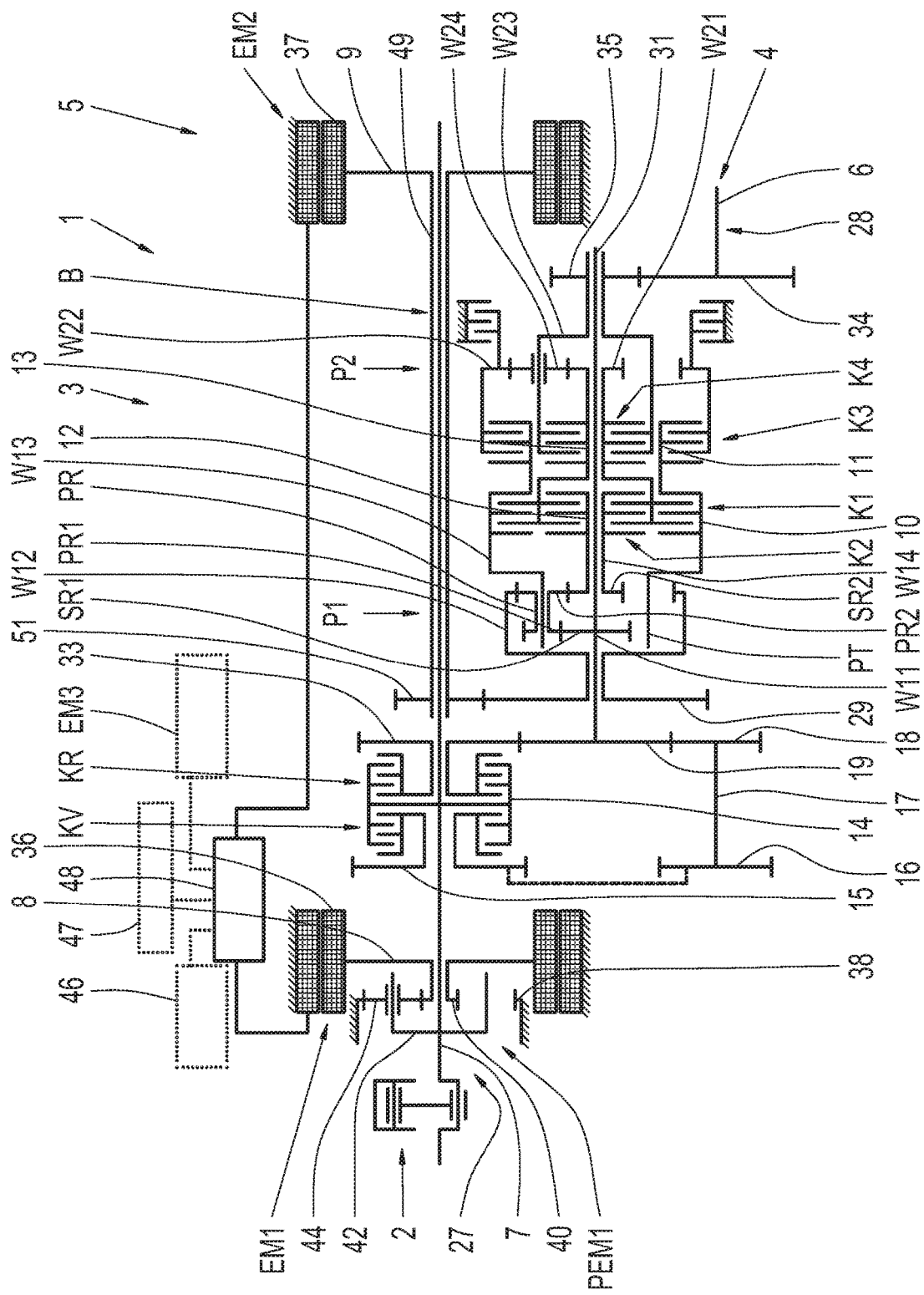

FIG. 16 shows a further example embodiment of the vehicle drive-train 1, which corresponds to a substantial extent with the vehicle drive-train 1 shown in FIG. 11. In the vehicle drive-train 1 according to FIG. 16, the driving-direction clutches KV and KR and the two planetary gearsets P1 and P2, together with the shifting elements K1 to K4 and B, are arranged in the axial direction between the two electric machines EM1 and EM2, which are coaxial with the transmission input shaft 7. In this case the first electric machine EM1 is arranged between the drive machine 2 and the two driving-direction clutches KV and KR, whereas the planetary gearsets P1 and P2 arranged coaxially on the countershaft 31 and the shifting elements K1 to K4 and B are positioned in the axial direction between the two driving-direction clutches KV and KR and the second electric machine EM2.

The second electric machine EM2 is arranged in the axial direction on the side of the second planetary gearset P2 facing away from the drive machine 2. Compared with the embodiment of the vehicle drive-train 1 according to FIG. 11, by virtue of the larger axial separation between the electric machines EM1 and EM2 of the electric variator 5 from one another, a reciprocal influencing of the magnetic fields of the two electric machines EM1 and EM2 is avoided. Furthermore, compared with the embodiment of the power-split transmission 3 according to FIG. 11, the second electric machine EM2 is coupled to the second shaft W12 of the first planetary gearset P1 by way of a smaller number of tooth engagements and the power-split transmission 3 can therefore be operated with higher efficiency.

Figure 17:
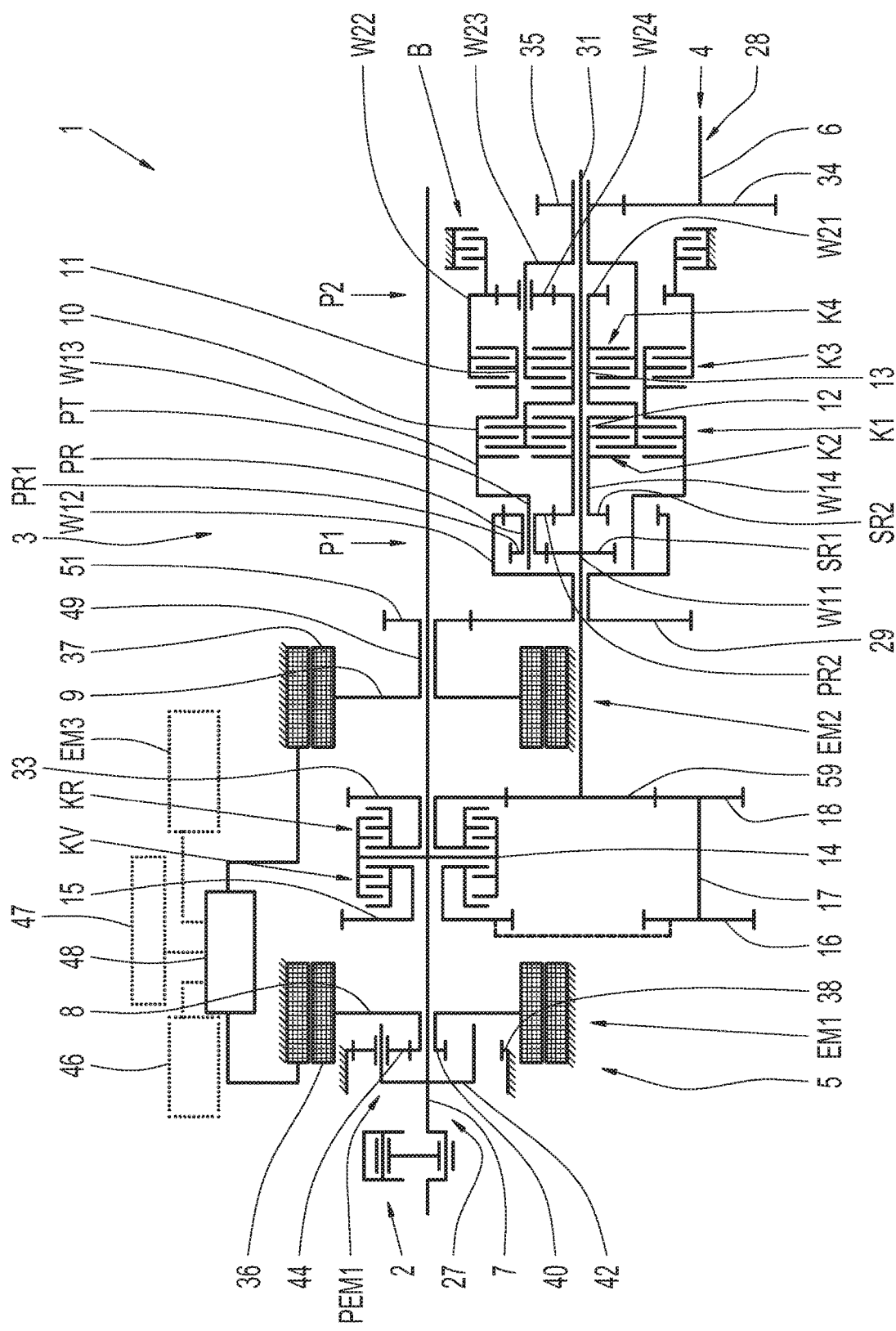

In the vehicle drive-train 1 shown in FIG. 17, which corresponds essentially to the vehicle drive-train 1 according to FIG. 16, the second electric machine EM2 is arranged in the axial direction between the driving-direction clutches KV and KR and the first planetary gearset P1, coaxially with the transmission input shaft 7. In this embodiment of the power-split transmission 3, the hollow shaft 49 is substantially shorter than in the example embodiment of the power-split transmission 3 shown in FIG. 16.

Figure 18:
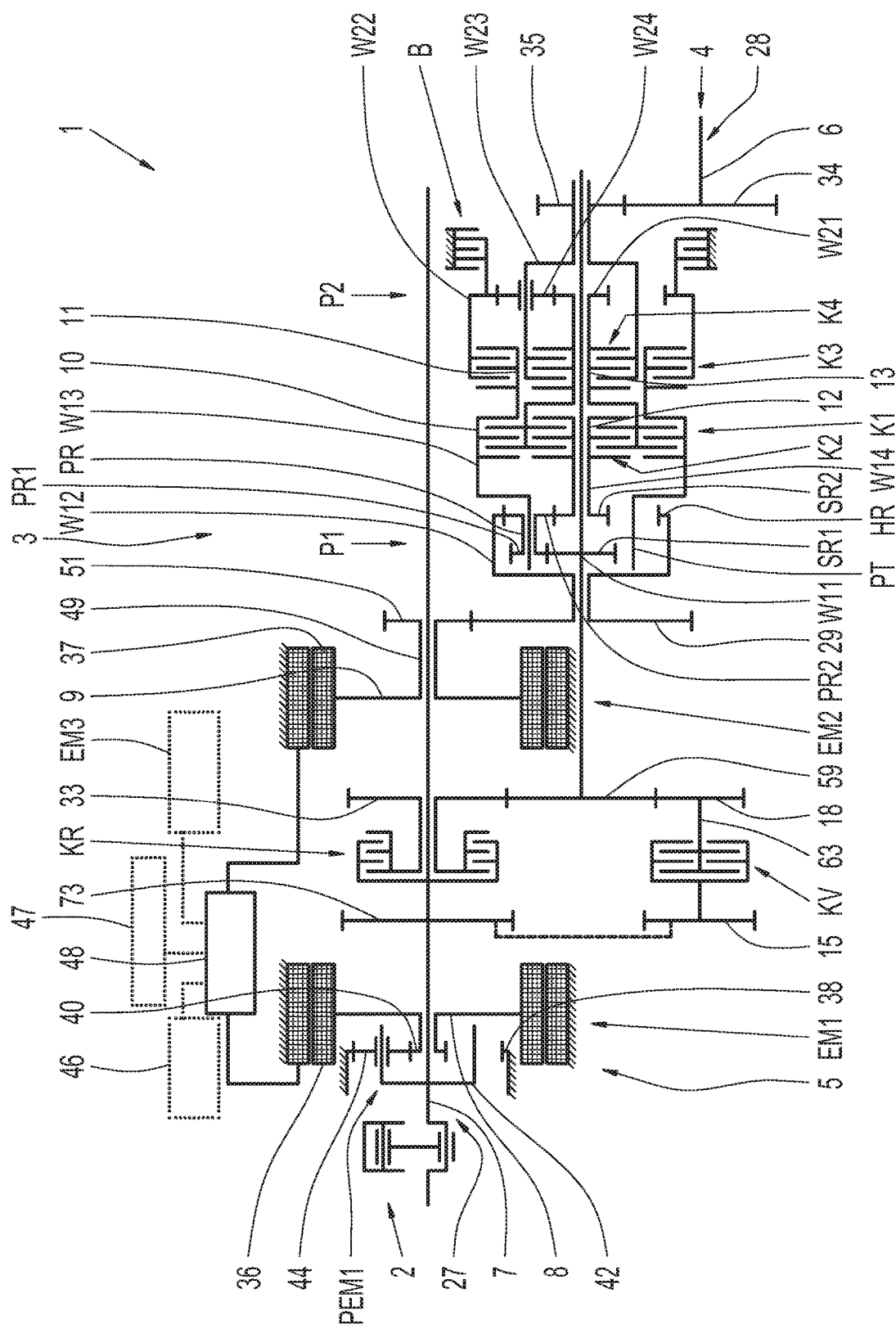

FIG. 18 shows an embodiment of the vehicle drive-train 1 that corresponds essentially to FIG. 17. In the vehicle drive-train 1 according to FIG. 18, the driving-direction clutches KV and KR are radially offset from one another and are arranged in the axial direction in a common plane of the power-split transmission 3. In this case the driving-direction clutch KR is arranged coaxially with the transmission input shaft 7, while the driving-direction clutch KV is arranged on a countershaft 63 a radial distance away from the transmission input shaft 7 and the countershaft 31.

The loose wheel 33 arranged together with the driving-direction clutch KR for reverse driving on the transmission input shaft 7, when the driving-direction clutch KR is in its closed condition, is connected rotationally fixed to the transmission input shaft 7 and meshes with the fixed wheel 59 of the countershaft 31. The loose wheel 15 associated with the driving-direction clutch KV for forward driving, when the driving-direction clutch KV is in its closed condition, is connected rotationally fixed to the fixed wheel 18, which is also engaged with the fixed wheel 59 of the countershaft. The loose wheel 15 meshes with a fixed wheel 73 of the transmission input shaft 7.

Figure 19:
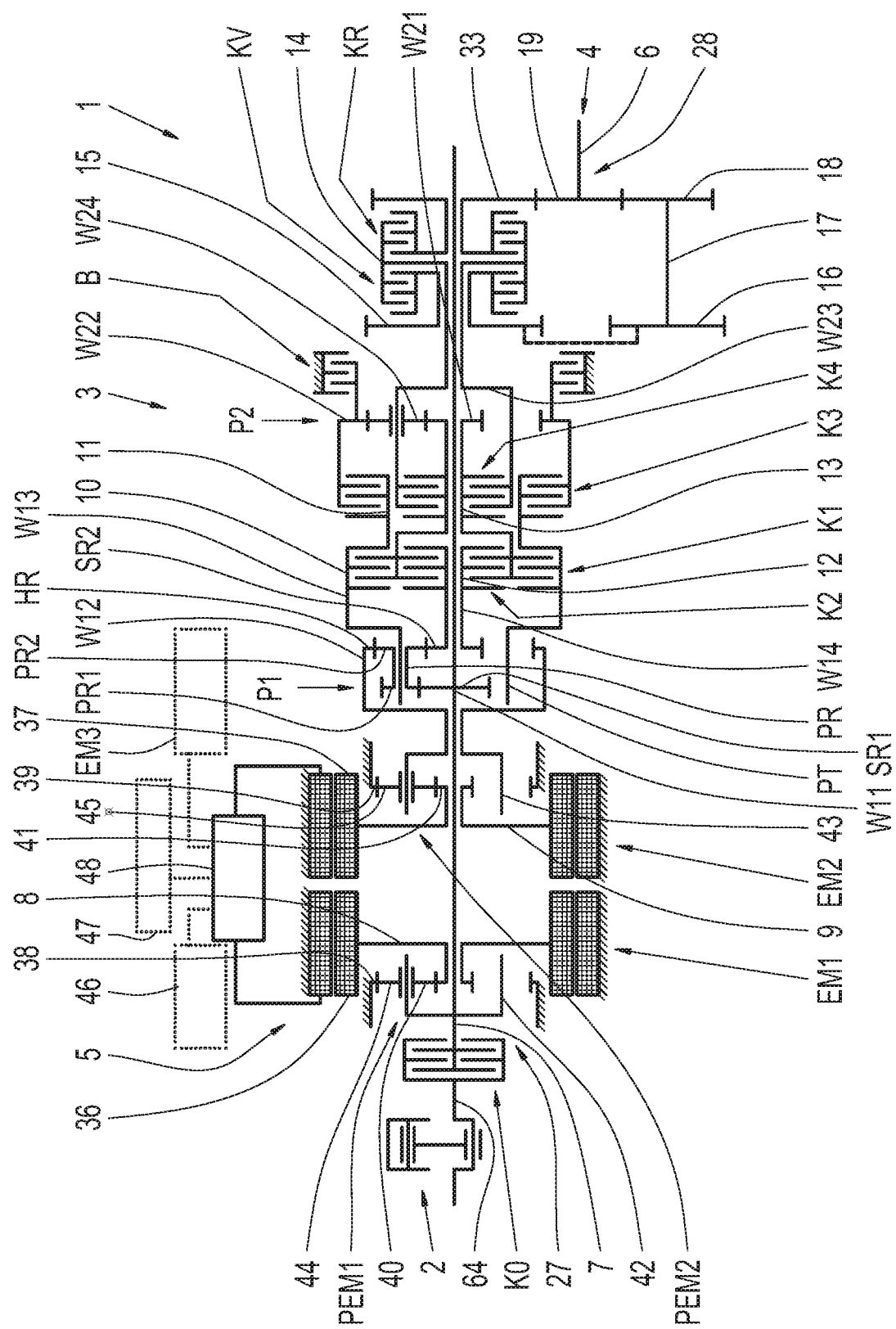

An embodiment of the vehicle drive-train 1 extended by a further shifting element K0 of the power-split transmission 3 compared with the embodiment of the vehicle drive-train 1 shown in FIG. 9, is shown in FIG. 19. In this case the further shifting element K0 is arranged between a motor output shaft 64 of the drive machine 2 and the transmission input shaft 7, so that when the shifting element K0 is in its open operating condition the drive machine 2 is decoupled from the transmission input shaft 7.

In addition, the possibility exists of arranging the shifting element K0 and the planetary gearset PEM1, again in a space-saving manner, radially within the first electric machine EM1 of the variator 5.

The additional shifting element K0 offers the possibility of enabling a vehicle made with the vehicle drive-train 1 according to FIG. 19 to drive purely electrically, without any emissions while at the same time the drive machine 2 is switched off, with losses as low as possible. This results from the fact that drag torques occurring in the area of the switched-off drive machine 2 when the additional shifting element K0 is open are not passed on to the area of the transmission input shaft 7. Furthermore the possibility also exists of driving a PTO shaft functionally connected to the transmission input shaft 7, with high efficiency, purely electrically and therefore without emissions from the drive machine 2. The electrical energy required for driving the vehicle and/or the PTO shaft purely electrically can again be supplied from an on-board electrical accumulator or from an external power source such as an external mains network.

Figure 20:
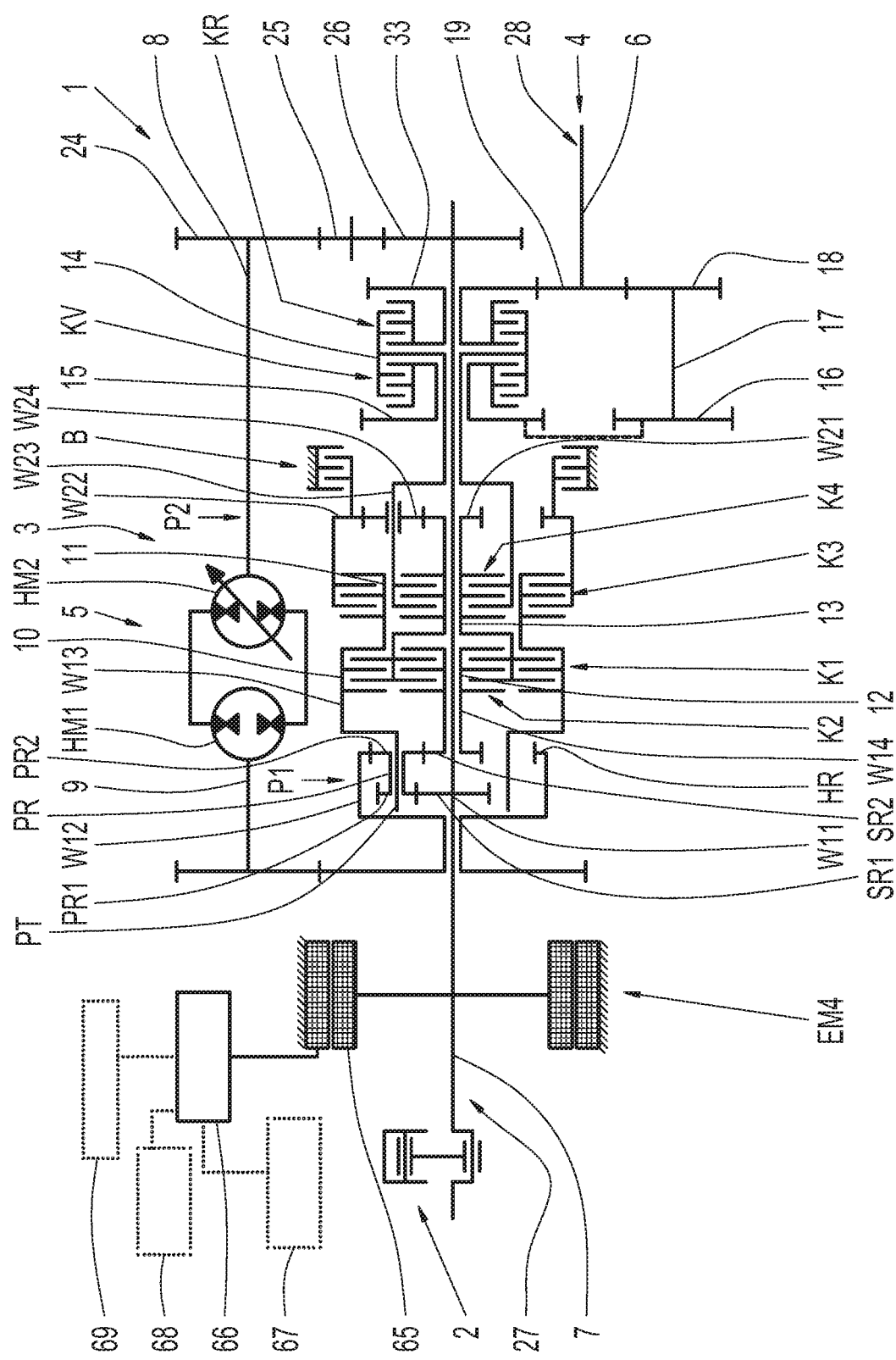

A further example embodiment of the vehicle drive-train 1 is shown in FIG. 20, which corresponds to the example embodiment shown in FIG. 1 but is additionally made with a further electric machine EM4. The further electric machine EM4 is arranged in the area of the transmission input shaft 7. A rotor 65 of the further electric machine EM4 is connected directly to the transmission input shaft 7. The further electric machine EM4 is associated with a regulation and control system 66 by way of which, in turn, electric consumers 67 such as an additional electric machine, an electrical storage device 68 and/or an on-board electrical network 69 can be acted upon with electrical energy starting from the further electric machine EM4. Moreover, it is possible that from the electrical storage device 68 or from an external power source connected to the vehicle, via the regulation and control system 66, electrical energy can be supplied to the further electric machine EM4. Then the further electric machine EM4 can be operated as a motor and during defined operating condition variations of the vehicle drive-train 1 torque from both the drive machine 2 and also from the electric machine EM4 can be introduced into the vehicle drive-train 1 for driving and/or for powering a PTO shaft functionally connected to the transmission input shaft 7.

Figure 21:
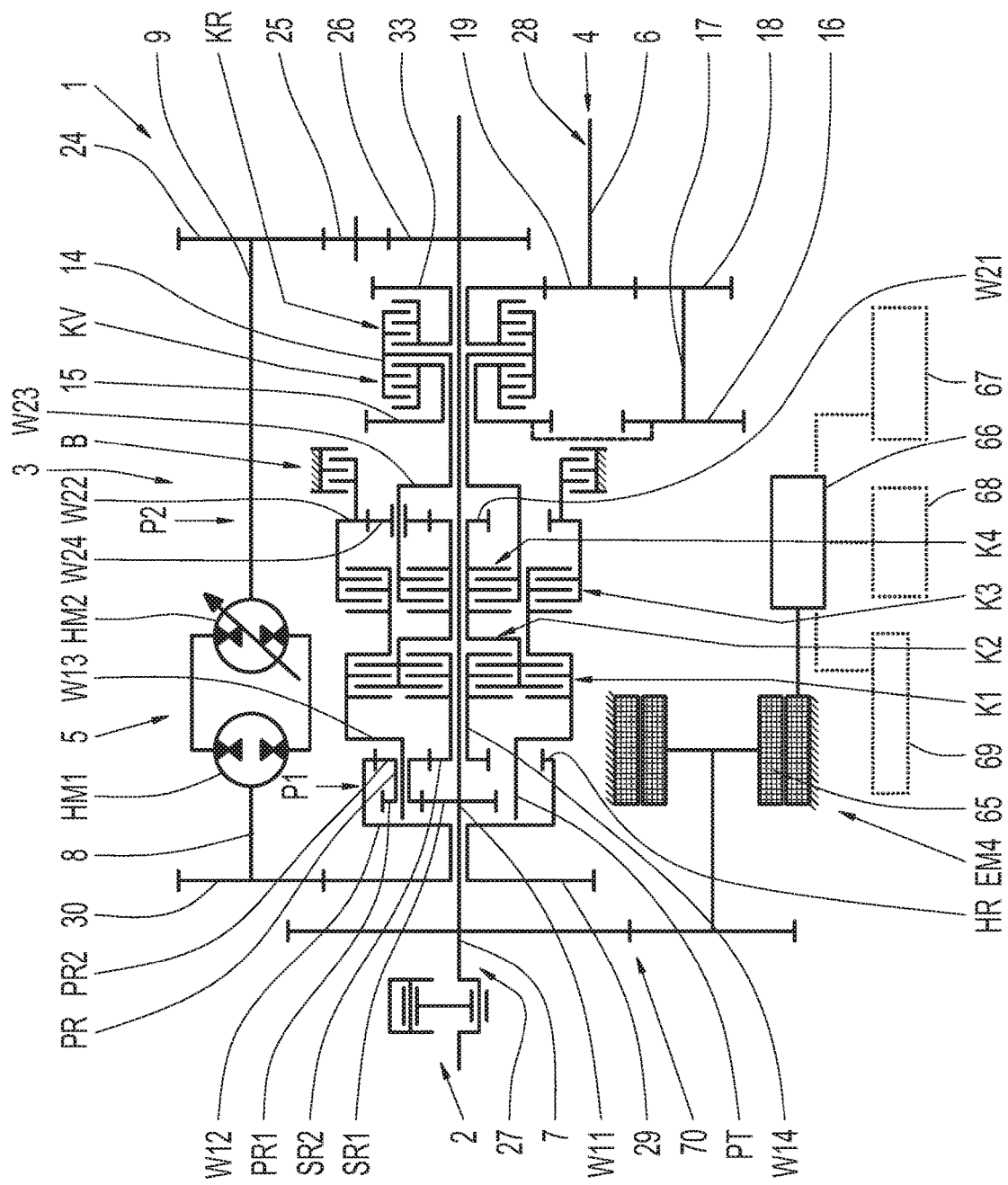

In the further example embodiment of the vehicle drive-train 1 shown in FIG. 21, the further electric machine EM4 is arranged radially a distance away from the transmission input shaft 7 and connected to the transmission input shaft 7 by a spur gear stage 70. In this case, the further electric machine EM4 is more compact in the radial direction than in the embodiment of the power-split transmission 3 shown in FIG. 20. In contrast to the embodiment of the further electric machine EM4 shown in FIG. 20, the further electric machine EM4 according to FIG. 21 is made with a longer axial length.

Figure 22:
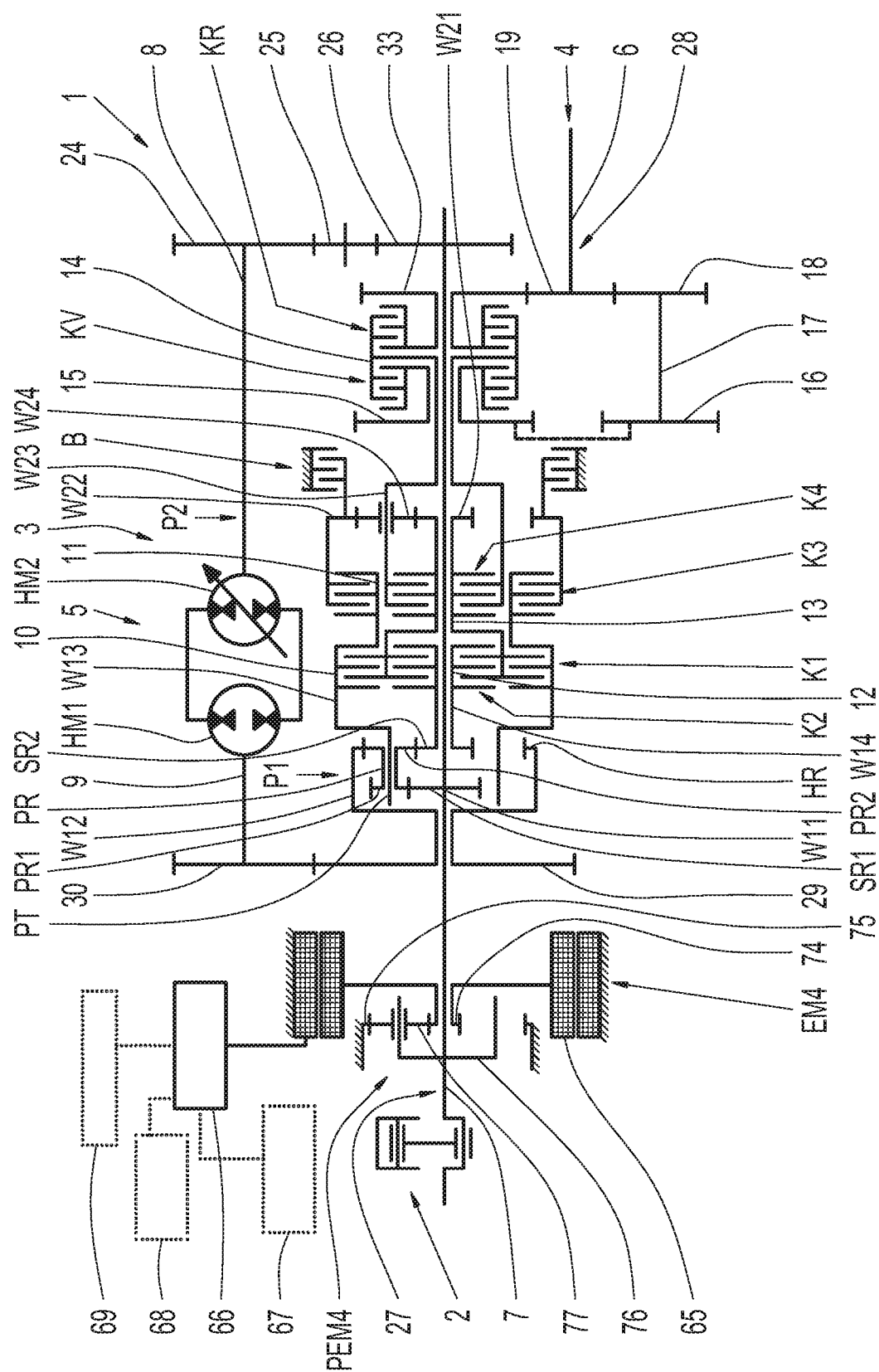

A further development of the vehicle drive-train 1 shown in FIG. 20 is shown in FIG. 22, in which the further electric machine EM4 is functionally connected to the transmission input shaft 7 via a planetary gearset PEM4. In this case the planetary gearset PEM4 has the same structure as the planetary gearsets PEM1 and PEM2 in FIG. 9. The rotor 65 of the further electric machine EM4 is connected to a sun gear 74 of the planetary gearset PEM4. A ring gear 75 of the planetary gearset PEM4 is fixed to the housing, while the transmission input shaft 7 is functionally connected to a planetary carrier 76 of the planetary gearset PEM4, on which planetary gearwheels 77 of the planetary gearset PEM4 are mounted to rotate.

Figure 23:
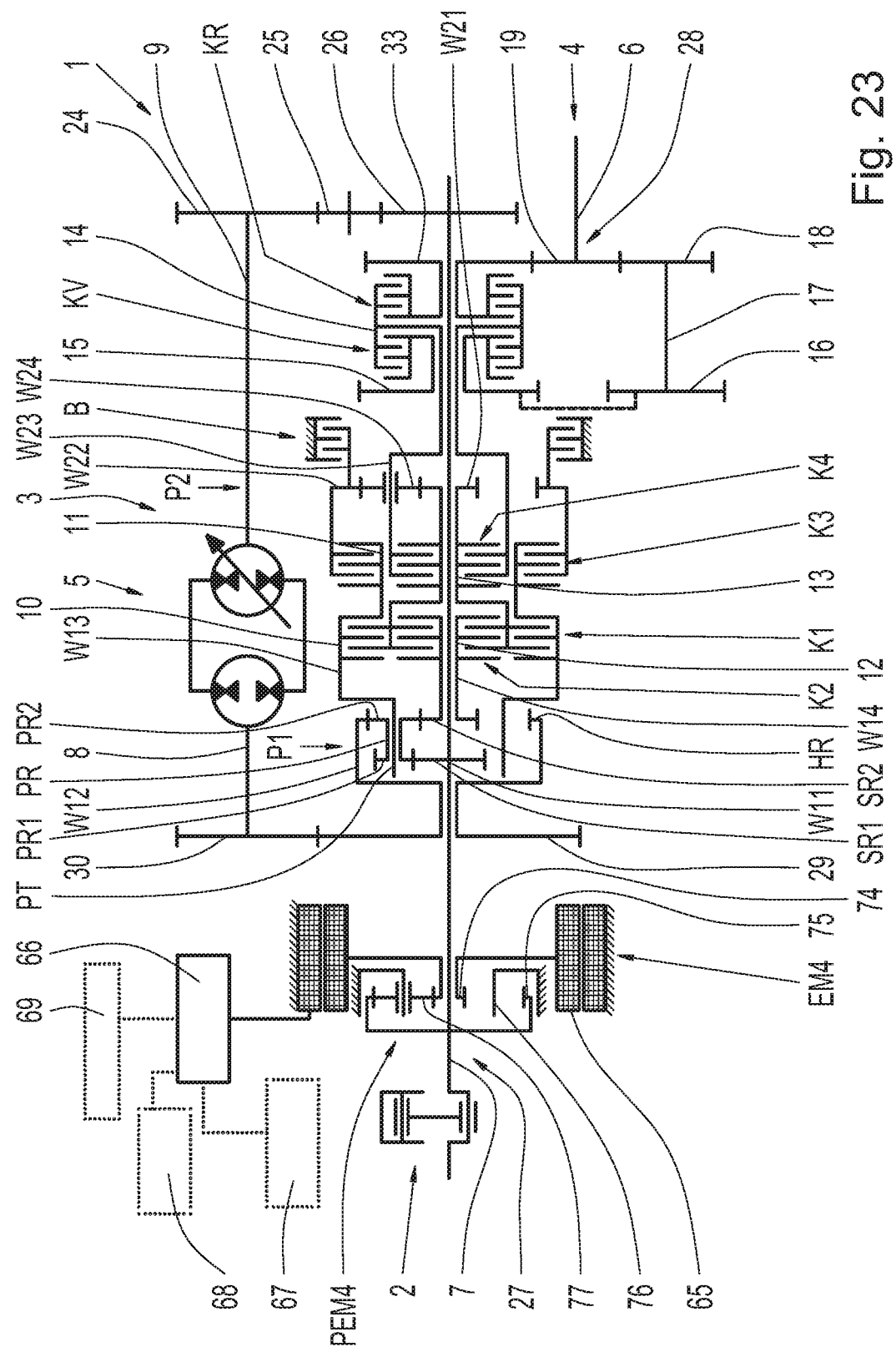

In contrast to the above, in the further example embodiment of the vehicle drive-train 1 shown in FIG. 23 the further electric machine EM4 is functionally connected to the transmission input shaft 7 by a planetary gearset PEM4 which has the same structure as the planetary gearsets PEM1 and PEM2 according to FIG. 10. The rotor 65 of the further electric machine EM4 is again coupled to the sun gear 74 of the planetary gearset PEM4. The ring gear 75 of the planetary gearset PEM4 is connected to the transmission input shaft 7. The planetary carrier 76 of the planetary gearset PEM4 is fixed to the housing.

Figure 24:
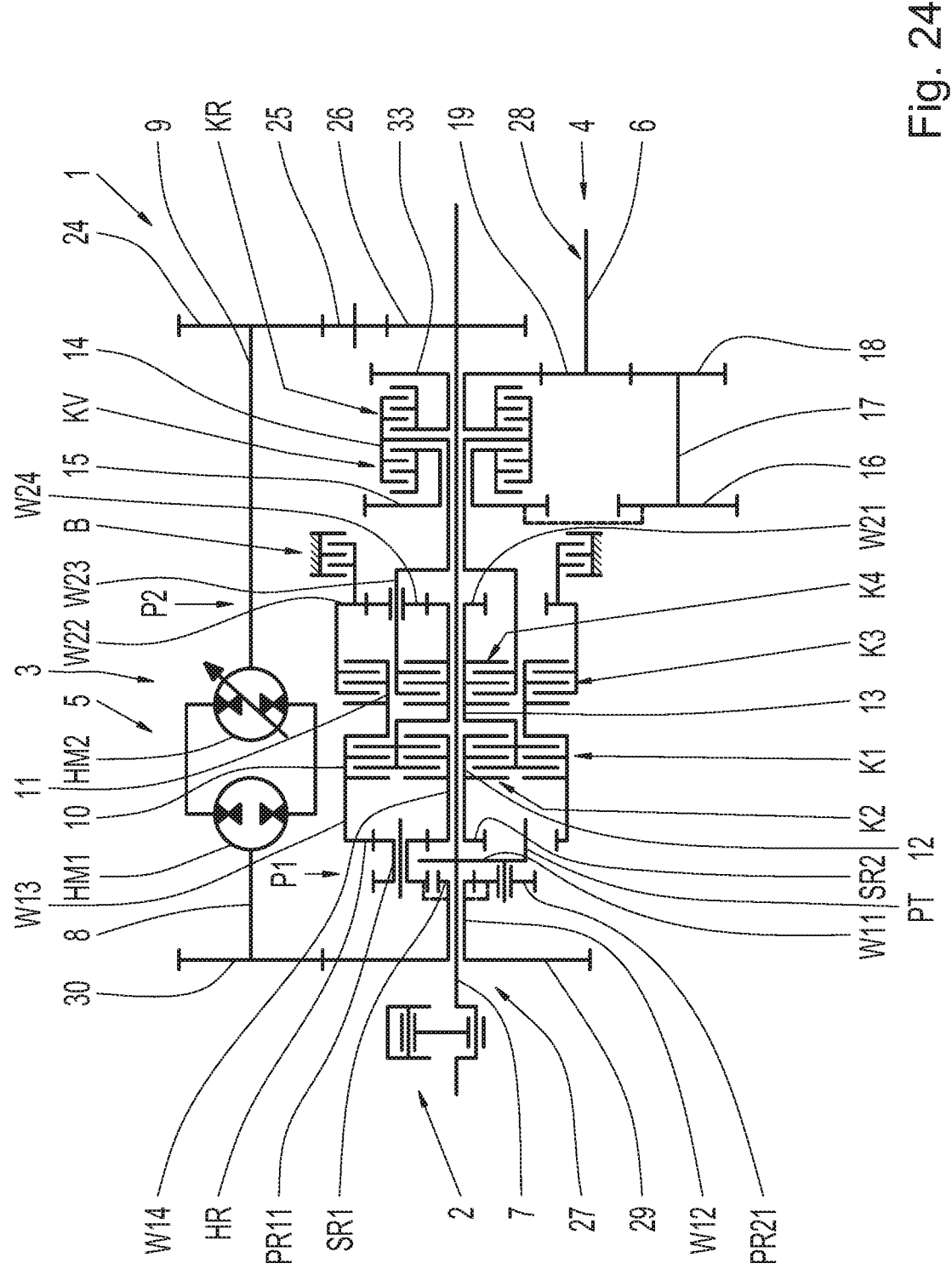

FIG. 24 shows a further example embodiment of the vehicle drive-train 1, which differs from the first embodiment of the vehicle drive-train 1 shown in FIG. 1 only in the area of the first planetary gearset P1. The first planetary gearset P1 of the vehicle drive-train 1 in FIG. 24 is made with a Ravigneaux gearset. In this case the first shaft W11 of the first planetary gearset P1 is functionally connected to a planetary carrier PT of the Ravigneaux gearset. The second shaft W12 of the first planetary gearset P1 is coupled to a sun gear SR1 of the Ravigneaux gearset, while the third shaft W13 of the first planetary gearset P1 is connected to a ring gear HR of the Ravigneaux gearset. The fourth shaft W14 of the first planetary gearset P1 is functionally connected to a further sun gear SR2 of the Ravigneaux gearset. The sun gear SR1 has a smaller diameter than the further sun gear SR2.

On the planetary carrier PT, a total of six planetary gearwheels PR11 and PR21 are mounted to rotate. In the present case three planetary gearwheels PR11 have a longer axial length than three other planetary gearwheels PR21. The longer planetary gearwheels PR11 mesh with the ring gear HR, the further sun gear SR2 and the shorter planetary gearwheels PR21. The shorter planetary gearwheels PR21 also engage with the smaller sun gear SR1.

The configuration of the first planetary gearset P1 with a Ravigneaux gearset has the advantage that the continuously variable power-split transmission 3 can be produced less expensively and takes up less fitting space, since the Ravigneaux gearset has only one web or planetary carrier PT and one ring gear HR.

Figure 25:
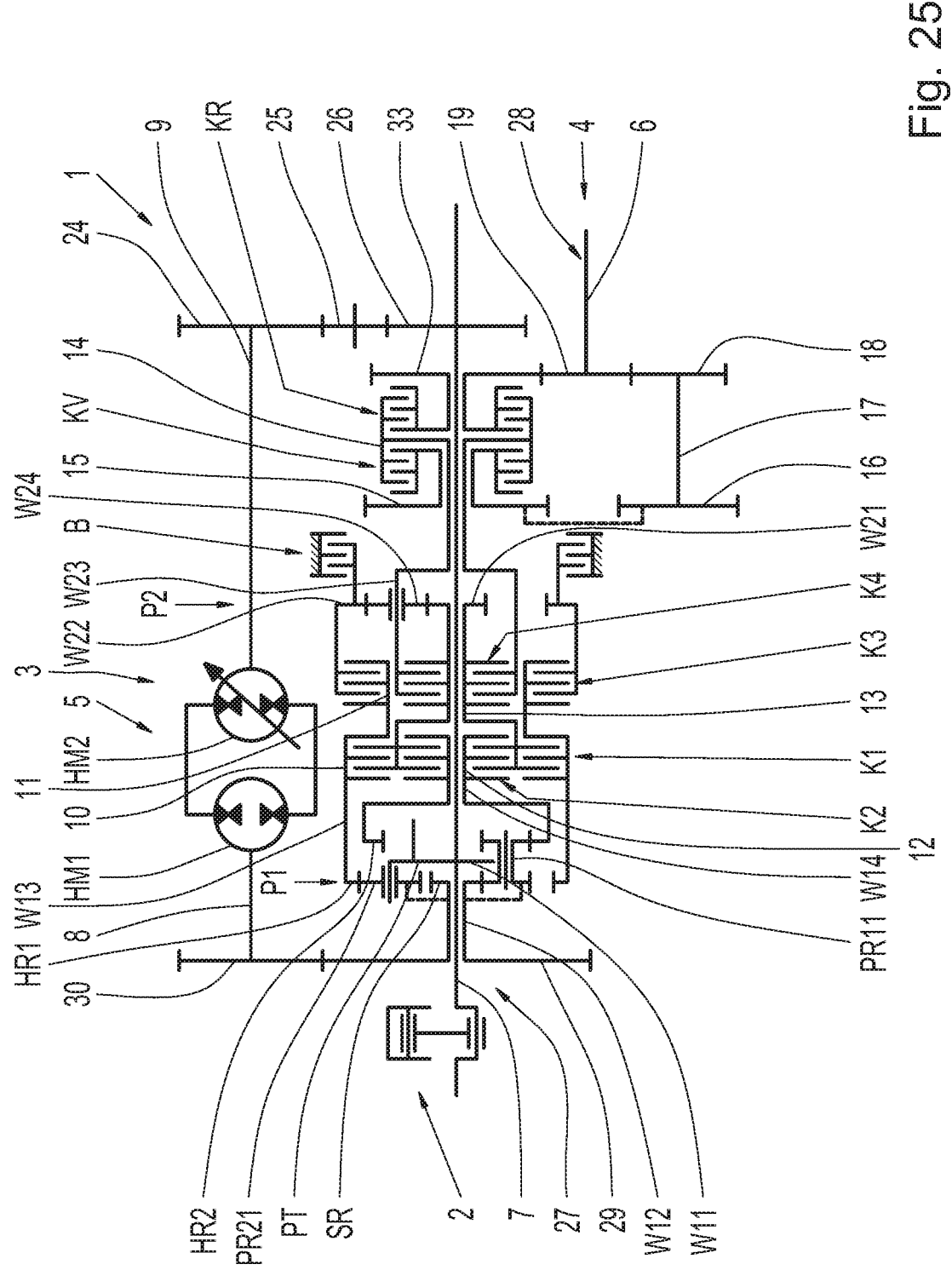

A further embodiment of the vehicle drive-train 1 is shown in FIG. 25 and is made with an inexpensive and space-saving power-split transmission 3 which, apart from the first planetary gearset P1, has essentially the same structure as the power-split transmission 3 according to FIG. 1. The first planetary gearset P1 of this power-split transmission 3 comprises a planetary gear assembly with two ring gears HR1 and HR2, a planetary carrier PT, and a sun gear SR.

On the planetary carrier PT are preferably mounted to rotate a total of six planetary gearwheels PR11 and PR21. Three planetary gearwheels PR11 are in this case axially longer than three other planetary gearwheels PR21. The longer planetary gearwheels PR11 mesh with the ring gear HR2, the sun gear SR and the shorted planetary gearwheels PR21. In addition the shorter planetary gearwheels PR21 engage with the other ring gear HR1. The ring gear HR2 has a smaller diameter than the ring gear HR1, and is surrounded radially by the larger ring gear HR1

The first shaft W11 of the first planetary gearset P1 is connected to the planetary carrier PT, while the second shaft W12 of the first planetary gearset P1 is functionally connected to the sun gear SR. In addition the third shaft W13 of the first planetary gearset P1 is coupled to the larger ring gear HR1 and the fourth shaft W14 of the first planetary gearset P1 is connected to the smaller ring gear HR2.

Figure 26:
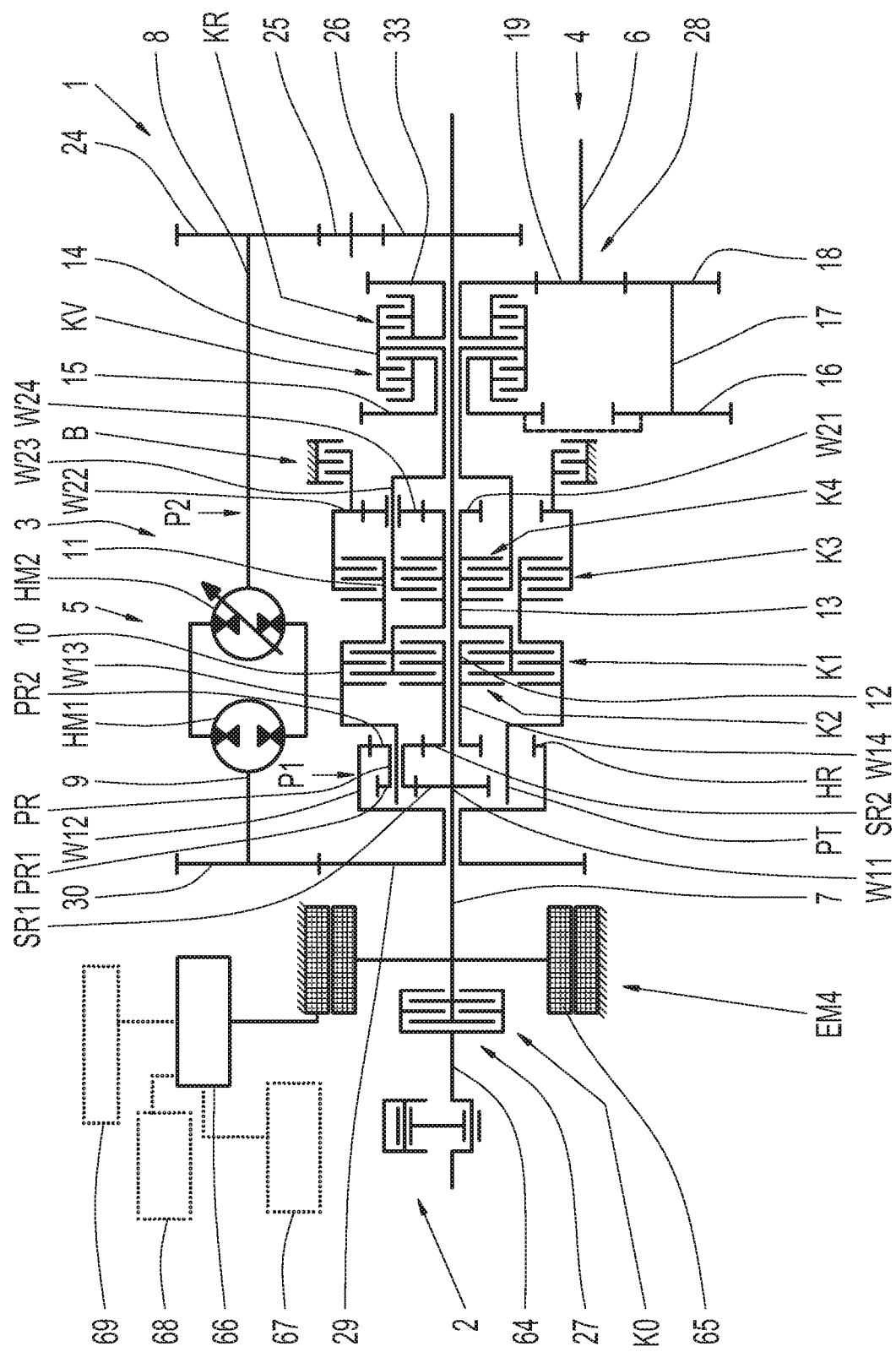

Besides the assemblies of the vehicle drive-train 1 according to FIG. 1, the vehicle drive-train 1 shown in FIG. 26 additionally comprises the shifting element K0 according to FIG. 19 and the further electric machine EM4 according to FIG. 20. Here too, it is again possible to arrange the shifting element K0 in a space-saving manner inside the further electric machine EM4.

Basically, all the example embodiments of the vehicle drive-train 1 or its continuously variable power-split transmission 3 shown in the drawing can be produced with a first planetary gearset P1 designed in accordance with FIG. 1, 4, 5A, 5B, 24 or 25. Furthermore, depending on the application at hand, in all the variants of the vehicle drive-train 1 described, the driving-direction clutches KV and KR can be arranged on the transmission input or on the transmission output side. Moreover, all the example embodiments of the vehicle drive-train 1 according to FIGS. 1 to 26 can be made either with a hydraulic or with an electric variator.

In addition, there is also the possibility that the different shifting elements are implemented as positive and/or frictional shifting elements, i.e. as claw shift elements, as synchronizers or as multi-plate clutches or multi-plate brakes. In addition, it can also be provided that changes between the driving ranges with low loads on the shifting elements K1 to K4 and B are carried out essentially synchronously.

Reversing processes too, of a vehicle built with a vehicle drive-train 1 can be assisted or carried out by appropriate actuation of the two driving-direction clutches KV and KR. In that connection it should also be pointed out that the mode of action of the two driving-direction clutches KV and KR can deviate from the mode of action described earlier, depending on the configuration of the vehicle drive-train 1 chosen, to the extent that a vehicle built with the vehicle drive-train 1 is driven in the reverse direction when the driving-direction clutch KV is closed and in the forward direction when the driving-direction clutch KR is closed.

INDEXES

1 Vehicle drive-train
2 Drive machine
3 Continuously variable power-split transmission
4 Drive output
5 Variator
6 Transmission output shaft
7 Transmission input shaft
8 First shaft of the variator
9 Second shaft of the variator
10 Shifting element half of the shifting element K1
11 Shifting element half of the shifting element K2
12 Shifting element half of the shifting element K3
13 Shifting element half of the shifting element K4

14 Shifting element half of the driving-direction clutches KV and KR
15 Loose wheel
16 Fixed wheel of the countershaft 17
17 Countershaft
18 Further fixed wheel of the countershaft 17
19 Fixed wheel of the transmission output shaft
20 Bevel gear
21 Further fixed wheel of the transmission output shaft
22 Loose wheel of the further countershaft 23
23 Further countershaft
24 Fixed wheel of the first shaft of the variator
25 Intermediate wheel
26 Fixed wheel
27 Transmission input
28 Transmission output
29 Gearwheel
30 Fixed wheel
31 Countershaft
32 Loose wheel
33 Loose wheel
34 Fixed wheel
35 Fixed wheel
36 Rotor of the first electric machine
37 Rotor of the second electric machine
38 Ring gear of the planetary gearset PEM1
39 Ring gear of the planetary gearset PEM2
40 Sun gear of the planetary gearset PEM1
41 Sun gear of the planetary gearset PEM2
42 Planetary carrier of the planetary gearset PEM1
43 Planetary carrier of the planetary gearset PEM2
44 Planetary gearwheel of the planetary gearset PEM1
45 Planetary gearwheel of the planetary gearset PEM2
46 Electric accumulator
47 On-board electrical network
48 Regulation and control system
49 Hollow shaft
50 Countershaft
51 Fixed wheel of the hollow shaft 49
52 Fixed wheel of the countershaft 50
53 Fixed wheel of the countershaft 50
54 Loose wheel
55 Fixed wheel of the hollow shaft 56
56 Hollow shaft
57 Further countershaft
58 Loose wheel of the further countershaft 57
59 Fixed wheel of the countershaft 31
60 Fixed wheel of the further countershaft 57
61 Fixed wheel of the third shaft W23 of the second planetary gearset P2
62 Fixed wheel
63 Countershaft
64 Motor output shaft of the drive machine
65 Rotor of the further electric machine EM4
66 Regulation and control system
67 Further electric consumer
68 Electric storage device
69 On-board electrical network
70 Spur gear stage
71 Gear chain
72 Fixed wheel of the countershaft 31
73 Fixed wheel of the transmission input shaft
74 Sun gear of the planetary gearset PEM4
75 Ring gear of the planetary gearset PEM4
76 Planetary carrier of the planetary gearset PEM4
77 Planetary gearwheels of the planetary gearset PEM4
78 Shifting element half of the shifting element K4

B Shifting element
EM1, EM2 Electric machine
EM3 Electric machine
EM4 Further electric machine
HM1, HM2 Hydraulic machine
HR Ring gear
HR1, HE2 Ring gar
HRE1, HRE2 Ring gear
K0 Further shifting element
K1 to K4 Shifting elements
K23 Further shifting element
KV, KR Driving-direction clutch
P1 First planetary gearset
P2 Second planetary gearset
PE1, PE2 Simple planetary gear assembly of the first planetary gearset
PEM1, PEM2, PEM4 Planetary gearset
PR Planetary gearwheel
PR1 Smaller diameter area of the planetary gearwheel
PR2 Larger diameter area of the planetary gearwheel
PR11, PR21 Planetary gearwheel
PRE1, PRE2 Planetary gearwheel
PT Planetary carrier
PTE1, PTE2 Planetary carrier
SR, SR1, SR2 Sun gear
SRE1, SRE2 Sun gear
W11 to W14 Shaft of the first planetary gearset
W21 to W23 Shaft of the second planetary gearset
W24 Planetary gearwheels of the second planetary gearset

The invention claimed is:

1. A continuously variable power-split transmission with at least four driving ranges, within which a gear ratio is continuously variable in an area of a variator,
a first planetary gearset comprising first, second, third and fourth shafts being functionally connectable, via a plurality of shifting elements, with a second planetary gearset that comprises a plurality of shafts,
the second planetary gearset being functionally connectable with a transmission output shaft,
the first planetary gearset comprising the first, the second, the third and the fourth shafts and being functionally connectable, by way of the first shaft, with a transmission input shaft and a first shaft of the variator and by, way of the second shaft, being functionally connected to a second shaft of the variator,
the first planetary gearset being coupled, by way of the third shaft, to shifting element halves of two shifting elements and, by way of the fourth shaft, being coupled to a shifting element half of a further shifting element,
first and second driving-direction clutches being engagable in and disengagable from a force flow, and
gearwheel pairs associated with the first and the second driving-direction clutches, such that a rotational direction of the transmission output shaft corresponds to a rotational direction of the transmission input shaft when the first driving-direction clutch is engaged and is different therefrom when the second driving-direction clutch is engaged, and the transmission input shaft being functionally connectable with the first shaft of the first planetary gearset, via the first and the second driving-direction clutches, or the transmission output shaft being functionally connectable with the second planetary gearset, via the first and the second driving-direction clutches.

2. The continuously variable power-split transmission according to claim 1, wherein the third shaft of the first planetary gearset is functionally connectable, via a first shifting element, with whose shifting element half the third shaft is coupled, with a first shaft of the second planetary gearset, and by a second shifting element, with whose shifting element half the third shaft of the first planetary gearset is also coupled, with a second shaft of the second planetary gearset.

3. The continuously variable power-split transmission according to claim 1, wherein the fourth shaft of the first planetary gearset is couplable by the further shifting element with a first shaft of the second planetary gearset and a shifting element half of an additional shifting element, so that by the additional shifting element the fourth shaft of the first planetary gearset is functionally connectable with a second shaft or with a third shaft of the second planetary gearset.

4. The continuously variable power-split transmission according to claim 1, wherein the fourth shaft of the first planetary gearset is couplable by the further shifting element to a first shaft of the second planetary gearset, while by an additional shifting element a second shaft of the second planetary gearset is functionally connectable with a third shaft of the second planetary gearset.

5. The continuously variable power-split transmission according to claim 1, wherein a second shaft of the second planetary gearset is connectable by a shifting element, in a rotationally fixed manner, to a component fixed to a housing.

6. The continuously variable power-split transmission according to claim 1, wherein in an area of the transmission input shaft a shifting element is provided, by which a drive machine of a vehicle drive-train made with the power-split transmission, that is couplable to the transmission input shaft, is functionally connectable with the first shaft of the first planetary gearset or is decouplable therefrom.

7. The continuously variable power-split transmission according to claim 1, wherein the transmission input shaft is functionally connected to an electric machine.

8. The continuously variable power-split transmission according to claim 7, wherein the first and the second driving-direction clutches are arranged in an area of the functional connection between the transmission input shaft and the first planetary gearset or in an area of the functional connection between the second planetary gearset and the transmission output shaft.

9. The continuously variable power-split transmission according to claim 1, wherein the variator is in a form of a hydraulic variator with two hydraulic machines such that a displacement volume of at least one of the hydraulic machines is variable.

10. The continuously variable power-split transmission according to claim 1, wherein the variator is an electric variator with two electric machines.

11. The continuously variable power-split transmission according to claim 1, wherein the variator is functionally connected by way of the first shaft, directly, or via spur gears and/or via a first planetary gearset, to the first shaft of the first planetary gearset, and by way of the second shaft, directly, or via spur gears and/or via a first planetary gearset, to the second shaft of the first planetary gearset.

12. The continuously variable power-split transmission according to claim 1, wherein at least two of the first planetary gearset, the second planetary gearset, the first and the second driving-direction clutches, the shifting elements and the variator are arranged coaxially with one another.

13. The continuously variable power-split transmission according to claim 1, wherein at least two of the first planetary gearset, the second planetary gearset, the first and the second driving-direction clutches, the shifting elements and the variator are arranged offset from one another and on countershafts spaced apart from one another.

14. The continuously variable power-split transmission according to claim 1, wherein the variator is arranged, in an axial direction, between the transmission input shaft and the first planetary gearset, coaxially with the first planetary gearset or, in a radial direction, offset relative to the first planetary gearset.

15. The continuously variable power-split transmission according to claim 1, wherein the second shaft of the first planetary gearset, in an axial direction, is connected to the second shaft of the variator between the transmission input and the first planetary gearset, while the first shaft of the variator is functionally connected to the first shaft of the first planetary gearset, in the axial direction between the second planetary gearset and the transmission output.

16. The continuously variable power-split transmission according to claim 8, wherein the first and the second driving-direction clutches are arranged radially offset relative to one another and, in an axial direction, in a common plane.

17. The continuously variable power-split transmission according to claim 15, wherein the transmission input and the transmission output are arranged on a same side or in the axial direction on different sides.

18. The continuously variable power-split transmission according to claim 1, wherein the first planetary gearset comprises a stepped planetary gearset and the first shaft of the first planetary gearset is connected to a sun gear of the stepped planetary gearset, the second shaft of the first planetary gearset is connected to a ring gear of the stepped planetary gearset, the third shaft of the first planetary gearset is connected to a planetary carrier of the stepped planetary gearset and the fourth shaft of the first planetary gearset is connected to a further sun gear of the stepped planetary gearset, and, on the planetary carrier, rotatably mounted stepped planetary gearwheels mesh in an area with a larger diameter with the ring gear and the further sun gear, whose diameter is smaller than the diameter of the sun gear, and the planetary gearwheels engage in an area with a smaller diameter with the sun gear.

19. The continuously variable power-split transmission according to claim 1, wherein the first planetary gearset comprises two ring gears, a sun gear and a planetary carrier, planetary gearwheels are mounted to rotate on the planetary carrier, at least one first planetary gearwheel meshes with one of the ring gears and with at least one second planetary gearwheel, while the at least one second planetary gearwheel engages with the other ring gear and the sun gear, and the first shaft of the first planetary gearset is connected to one of the ring gears, the second shaft of the first planetary gearset is connected to the other ring gear, the third shaft of the first planetary gearset is connected to the planetary carrier and the fourth shaft of the first planetary gearset is connected to the sun gear.

20. The continuously variable power-split transmission according to claim 19, wherein the first planetary gearwheel and the second planetary gearwheel are arranged offset from one another in an axial direction and are mounted to rotate on the planetary carrier on a same diameter, and, like the two ring gears, the first planetary gearwheel and the second planetary gearwheel have the same number of teeth.

21. The continuously variable power-split transmission according to claim 1, wherein the first planetary gearset comprises two simple planetary gear assemblies, each with a respective ring gear, a planetary carrier with planetary gearwheels mounted to rotate thereon, and a sun gear, the first shaft of the first planetary gearset is connected to the planetary carrier of the first simple planetary gear assembly, the second shaft of the first planetary gearset is connected to the sun gear of the first simple planetary gear assembly and to the ring gear of the second simple planetary gear assembly, the third shaft of the first planetary gearset is connected to the planetary carrier of the second simple planetary gear assembly, and the fourth shaft of the first planetary gearset is connected to the sun gear of the second simple planetary gear assembly and to the ring gear of the first simple planetary gear assembly.

22. The continuously variable power-split transmission according to claim 21, wherein the first simple planetary gear assembly is arranged radially inside the second simple planetary gear assembly.

23. The continuously variable power-split transmission according to claim 1, wherein the first planetary gearset comprises two simple planetary gear assemblies, each with a ring gear, a planetary carrier with planetary gearwheels mounted to rotate on thereon, and a sun gear, the first shaft of the first planetary gearset is connected to the planetary carrier of the first simple planetary gear assembly, the second shaft of the first planetary gearset is connected to the ring gear of the second simple planetary gear assembly, the third shaft of the first planetary gearset is connected to the planetary carrier of the second simple planetary gear assembly and to the ring gear of the first simple planetary gear assembly, and the fourth shaft of the first planetary gearset is connected to the sun gear of the second simple planetary gear assembly and to the sun gear of the first simple planetary gear assembly.

24. The continuously variable power-split transmission according to claim 1, wherein the first planetary gearset comprises a Ravigneaux gearset, the first shaft of the first planetary gearset is functionally connected to a planetary carrier of the Ravigneaux gearset, the second shaft of the first planetary gearset is functionally connected to a sun gear of the Ravigneaux gearset, the third shaft of the first planetary gearset is functionally connected to a ring gear of the Ravigneaux gearset and the fourth shaft of the first planetary gearset is functionally connected to a further sun gear of the Ravigneaux gearset, and the sun gear has a smaller diameter than the further sun gear.

25. The continuously variable power-split transmission according to claim 1, wherein the first planetary gearset of the power-split transmission comprises a planetary gearset with two ring gears, a planetary carrier and a sun gear, a plurality of planetary gearwheels are mounted to rotate on the planetary carrier and some of the planetary gearwheels have a longer axial length than a rest of the planetary gearwheels, the longer planetary gearwheels mesh with one of the ring gears, the sun gear and the shorter planetary gearwheels, the shorter planetary gearwheels engage with the further ring gear and the longer planetary gearwheels, and one ring gear has a smaller diameter than the other ring gear and is radially surrounded by the larger ring gear.

26. The continuously variable power-split transmission according to claim 23, wherein the first shaft of the first planetary gearset is coupled to the planetary carrier, the second shaft of the first planetary gearset is coupled to the sun gear, the third shaft of the first planetary gearset is coupled to the larger ring gear and the fourth shaft of the first planetary gearset is coupled to the smaller ring gear.

27. The continuously variable power-split transmission according to claim 1, wherein the second planetary gearset is in a form of a simple planetary gear assembly, a first shaft of the second planetary gearset is a sun gear, a second shaft of the second planetary gearset is a ring gear and a third shaft of the second planetary gearset is a planetary carrier, with planetary gearwheels mounted to rotate on the planetary carrier.

* * * * *